（12）United States Patent
Dejneka et al.

US010858280B2

(10) Patent No.: US 10,858,280 B2
(45) Date of Patent: Dec. 8, 2020

(54) AUTOMOTIVE AND ARCHITECTURAL GLASS ARTICLES AND LAMINATES

(71) Applicant: CORNING INCORPORATED, Corning, NY (US)

(72) Inventors: Matthew John Dejneka, Corning, NY (US); Sinue Gomez, Corning, NY (US); Lisa Anne Tietz Moore, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 372 days.

(21) Appl. No.: 15/817,899

(22) Filed: Nov. 20, 2017

(65) Prior Publication Data

US 2018/0141850 A1 May 24, 2018

Related U.S. Application Data

(60) Provisional application No. 62/425,122, filed on Nov. 22, 2016.

(51) Int. Cl.
| | | |
|---|---|---|
| *C03C 3/091* | (2006.01) | |
| *B32B 17/10* | (2006.01) | |
| *C03C 3/085* | (2006.01) | |
| *C03C 3/087* | (2006.01) | |
| *C03C 4/02* | (2006.01) | |
| *B60J 1/00* | (2006.01) | |
| *C03C 21/00* | (2006.01) | |
| *C03C 4/18* | (2006.01) | |
| *C03C 4/08* | (2006.01) | |
| *C03C 1/00* | (2006.01) | |

(52) U.S. Cl.
CPC ........ *C03C 3/091* (2013.01); *B32B 17/10036* (2013.01); *B32B 17/1077* (2013.01); *B32B 17/10119* (2013.01); *B32B 17/10137* (2013.01); *B32B 17/10761* (2013.01); *B32B 17/10788* (2013.01); *B60J 1/001* (2013.01); *C03C 1/00* (2013.01); *C03C 3/085* (2013.01); *C03C 3/087* (2013.01); *C03C 4/02* (2013.01); *C03C 4/08* (2013.01); *C03C 4/18* (2013.01); *C03C 21/002* (2013.01); *B32B 2605/006* (2013.01); *C03C 2204/00* (2013.01)

(58) Field of Classification Search
CPC ......... C03C 3/083; C03C 3/095; C03C 3/087; C03C 3/091; C03C 1/00; C03C 3/085; C03C 4/02; C03C 4/08; C03C 4/18; C03C 21/002; C03C 2204/00; B23B 17/10036; B23B 17/10119; B23B 17/10137; B23B 17/1077; B23B 17/10761; B23B 17/10788; B23B 2605/006; B60J 1/001
See application file for complete search history.

(56) References Cited

U.S. PATENT DOCUMENTS

| | | |
|---|---|---|
| 3,254,738 A | 6/1966 | Larsen |
| 5,928,793 A | 7/1999 | Kimura |
| 9,133,052 B2 | 9/2015 | Maguruma |
| 2012/0094084 A1 | 4/2012 | Fisher et al. |
| 2015/0051061 A1 | 2/2015 | Kiczenski et al. |
| 2015/0064474 A1 | 3/2015 | Dejneka et al. |
| 2015/0118497 A1 | 4/2015 | Dejneka et al. |
| 2015/0166400 A1 | 7/2015 | Yamamoto |
| 2015/0166401 A1 | 7/2015 | Yamamoto |
| 2015/0239772 A1 | 8/2015 | Baker et al. |
| 2016/0130177 A1 | 5/2016 | Kurachi et al. |

FOREIGN PATENT DOCUMENTS

| | | |
|---|---|---|
| EP | 1462244 A1 | 9/2004 |
| WO | 2016028625 A1 | 2/2016 |

OTHER PUBLICATIONS

Carl et al; "The Effect of Composition on UV-VIS-NR Spectra of Iron Doped Glasses in the Systems Na2O/MgO/SiO2 and Na2O/MgO/Al2O3/SiO2"; Journal of Non-Crystalline Solids, 353 (2007), pp. 244-249.
Sakaguchi et al; "Compositional Dependence of Infrared Absorption of Iron-Doped Silicate Glasses"; Journal of Non-Crystalline Solids; 353 (2007); pp. 4753-4761.
Wiedenroth et al; "The Effect of Mixed Alkaline Earths on the Diffusivity and the Incorporation of Iron in 5Na2O·xMgO·(15−x)CaO·yAl2O3·(80−y)SiO2 Melts"; Journal of Non-Crystalline Solids; 330 (2003); pp. 90-98.
Invitation to Pay Additional Fees of the International Searching Authority; PCT/US2017/062739; Mailed Feb. 1, 2018; 23 Pages; European Patent Office.

*Primary Examiner* — Elizabeth A. Bolden

(57) ABSTRACT

Embodiments of glass articles exhibiting a grey or a green tint are described. In one or more embodiments, the glass article comprises a glass composition including $SiO_2$, $Al_2O_3$, $B_2O_3$ or MgO, a non-zero amount of alkali metal oxides ($R_2O$), $R_2O$—$Al_2O_3$ in the range from about −0.5 to about 1.5; and up to 1 mol % $Fe_2O_3$. In one or more embodiments, the glass composition includes a ratio of $R_2O$ to $Al_2O_3$ equal to or greater than about 1, $Na_2O$, from 0-13 mol % MgO, at least one of $K_2O$, $SnO_2$ and $TiO_2$. Laminates including such glass articles and methods of making the glass articles are also described.

38 Claims, 17 Drawing Sheets

AUTOMOTIVE AND ARCHITECTURAL GLASS ARTICLES AND LAMINATES

CROSS-REFERENCE TO RELATED APPLICATIONS

This application claims the benefit of priority under 35 U.S.C. § 119 of U.S. Provisional Application Ser. No. 62/425,122 filed on Nov. 22, 2016, the content of which is relied upon and incorporated herein by reference in its entirety.

BACKGROUND

The disclosure relates to glass compositions and laminates, and more particularly to glass compositions and thin laminates exhibiting solar performance properties for use in automotive and architectural applications.

Glass is often used in windows due to its optical clarity and durability. For automotive glazing and interior applications and architectural applications, the glass strength may be enhanced to resist damage due to scratches and impacts. Glass is also relatively dense, adding to automotive or architectural component weight and thereby lowering fuel efficiency and increasing greenhouse gas emission.

Currently, automotive and architectural applications use thick monolithic glass articles or substrates that are thermal tempered. Such articles have a thickness of about 3 mm or greater. Some applications use laminates including of two thinner glass articles (having a thickness in a range from about 1.6 mm to about 2.1 mm), which are separately heat strengthened and joined to an intervening polymer layer or separated by an air gap. The incumbent laminate construction offers reduced weight and improved acoustic performance over monolithic configurations, but suffers from reduced durability due to strengthening limitations of currently available for thinner glass articles.

Thermal tempering is commonly used with thick glass articles and can be used to create a thick compressive layer on the glass surface that extends typically to 21% of the overall glass thickness; however the surface compressive stress magnitude of such thermally tempered glass articles is relatively low and is typically less than about 100 MPa. Furthermore, thermal tempering becomes increasingly ineffective for thin glass articles (e.g., glass articles having a thickness of less than about 2 mm). In contrast, the chemical strengthening using an ion exchange process can create high levels of compressive stress (e.g., as great as about 1,000 MPa), and is suitable for very thin glass.

Automotive glazing also requires solar performance characteristics including certain transmission attributes in the ultraviolet (UV), visible (Vis) and total solar spectrum. Windows used in architectural applications may also require similar solar performance characteristics. Selective absorption in the different regions of the light spectrum can be achieved by the addition of transition metals. Iron for example is a common addition to glass since it has selective absorption in all the regions of the light spectrum. The amount of absorption or transmission will depend on the absorber and the optical path (i.e., the thickness of the glass article). Thinner glass articles will require higher amounts of dopants to exhibit the same or similar transmission characteristics of thicker glass articles having the same composition.

Accordingly, there is a need for a glass composition that can be made into thin glass articles, which may be used in laminates, where the resulting article can be chemically strengthened to the desired degree and the article and laminate exhibits the solar performance desired by some automotive and architectural applications.

SUMMARY

A first aspect of this disclosure pertains to a glass article exhibiting a grey tint. In some instances, the glass article may be strengthened. In one or more embodiments, when the glass article has a thickness of 0.7 mm, it exhibits an average total solar transmittance of about 88% or less, over a wavelength range from about 300 nm to about 2500 nm. In some embodiments, the glass article exhibits an average transmittance in the range from about 75% to about 85%, at a thickness of 0.7 mm, over a wavelength range from about 380 nm to about 780 nm. The glass article may exhibit color coordinates in transmittance, under CIE L*a*b* (CIELAB) color space, under a D65 illuminant, wherein a* is in the range from about −2 to about 5, b* is in the range from about −1 to about 10, and L* is in the range from about 55 to about 98.

In one or more embodiments, the glass article includes a glass composition including $SiO_2$ in an amount in the range from about 40 mol % to about 80 mol %, $Al_2O_3$ in an amount greater than about 4 mol %, CaO in an amount less than about 6 mol %, $B_2O_3$ or MgO, wherein MgO is present in an amount in the range from about 0 to about 13 mol %, a non-zero amount of alkali metal oxides ($R_2O$), wherein the glass article exhibits a difference between $R_2O$ and the amount of $Al_2O_3$ in the range from about −0.5 to about 1.5, and Fe expressed as $Fe_2O_3$, wherein Fe is present in an amount up to about 1 mol %. In one or more embodiments the total amount of Fe, expressed as $Fe_2O_3$, is present in an amount in the range from about 0.1 mol % to about 1 mol %. In one or more specific embodiments, the glass composition may include $SiO_2$ in an amount in the range from about 60 mol % to 75 mol %, $Al_2O_3$ in an amount in the range from about 8 mol % to about 14 mol %, $B_2O_3$ in an amount in the range from about 6 mol % to about 10 mol %, $R_2O$ in an amount in the range from about 6 mol % to about 14 mol %, and MgO in an amount in the range from about 0 mol % to about 2 mol %.

In one or more embodiments, the glass composition further comprises $SnO_2$ in an amount equal to or less than about 0.2 mol %. In one or more embodiments, the glass composition further comprises a compositional ratio of $R_2O$ to $Al_2O_3$ that is less than or equal to about 1.5 or in the range from about 0.8 to about 1.5. In some instances, the glass composition further comprises $Li_2O$.

The glass composition may include a total amount of Co, expressed as $Co_3O_4$, in an amount in the range from about 0.001 mol % to 0.007 mol %. In some embodiments, the glass composition further comprises any one or more of NiO, $V_2O_5$, and $TiO_2$.

A second aspect of this disclosure pertains to a glass article exhibiting a green tint. In some instances, the glass article may be strengthened. In one or more embodiments, the glass article has a thickness of 0.7 mm, the glass article exhibits has an average total solar transmittance of about 88% or less, over a wavelength range from about 300 nm to about 2500 nm. In some instances, when the glass has a thickness of 0.7 mm, the glass article exhibits an average transmittance in the range from about 75% to about 85%, over a wavelength range from about 380 nm to about 780 nm. In some embodiments, the glass article exhibits color coordinates in transmittance, under CIE L*a*b* (CIELAB) color space, under a D65 illuminant, wherein a* is in the range from about −10 to about 0, b* is in the range from about −3 to about 10 and L* is in the range from about 80 to about 95.

In one or more embodiments, the glass article includes a glass composition including $SiO_2$ in an amount in the range from about 40 mol % to about 80 mol %, $Al_2O_3$ in an amount greater than about 5% mol %, a total amount of alkali metal oxides ($R_2O$), wherein a ratio of $R_2O$ to $Al_2O_3$ equal to or greater than about 1 (or from about 1 to about 12), $Na_2O$, MgO in an amount in the range from about 0 to about 13 mol %, at least one of $K_2O$, $SnO_2$ and $TiO_2$, wherein $K_2O$ is present in an amount greater than 1 mol % and, wherein $TiO_2$ is present in an amount less than about 2.5 mol %, and a ratio of $Na_2O$ to $K_2O$ greater than about 10. In some embodiments, the glass composition further comprises $SnO_2$ in an amount equal to or less than about 0.2 mol %. Optionally, the glass composition is substantially free of $Li_2O$. The glass composition of one or more embodiments may be substantially free of $B_2O_3$. In one or more specific embodiments the glass composition comprises: $SiO_2$ in an amount in the range from about 60 mol % to 75 mol %, $Al_2O_3$ in an amount in the range from about 6 mol % to about 12 mol %, $R_2O$ in an amount in the range from about 10 mol % to about 16 mol %; and MgO in an amount in the range from about 1 mol % to about 10 mol %.

In one or more embodiments the glass composition further comprises Fe expressed as $Fe_2O_3$, wherein the total amount of Fe expressed as $Fe_2O_3$ is in a range from about 0 mol % to about 1 mol %. In some instances, the glass composition further comprises any one or more of NiO, $V_2O_5$, Co expressed as $Co_3O_4$, and $TiO_2$.

A third aspect of this disclosure pertains to a laminate comprising: a first glass layer, an interlayer disposed on the first glass layer; and a second glass layer disposed on the interlayer opposite the first glass layer, wherein either one of or both the first glass layer and the second glass layer comprises the glass article described herein according to one or more embodiments. In some embodiments, either one of or both the first glass layer and the second glass layer comprise a thickness less than 1.6 mm. In some embodiments, either one of or both the first glass layer and the second glass layer is strengthened.

A fourth aspect of this disclosure pertains to a method for forming the glass article described herein according to one or more embodiments. In one or more embodiments, the method includes melting a batch composition at a temperature greater than about 1300° C. to form a molten glass, wherein the batch composition comprises an iron source and the glass composition described herein according to one or more embodiments. The method includes forming the molten glass into a sheet.

In one or more embodiments of the method, the batch composition is melted in an environment comprising an oxygen fugacity of less than about 0.2. The iron source may include any one or more of $Fe_2O_3$, $Fe_3O_4$, and iron oxalate. In some instances, melting the batch comprises adding a reducing agent to the batch. The reducing agent may include carbon, and carbon-containing compounds.

A fifth aspect of this disclosure pertains to a vehicle comprising: a body comprising an interior; an opening in the body in communication with interior; a window disposed in the opening, the window comprising the glass article or a laminate, according to one or more embodiments described herein.

Unless otherwise specified, the glass compositions disclosed herein are described in mole percent (mol %) as analyzed on an oxide basis. Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
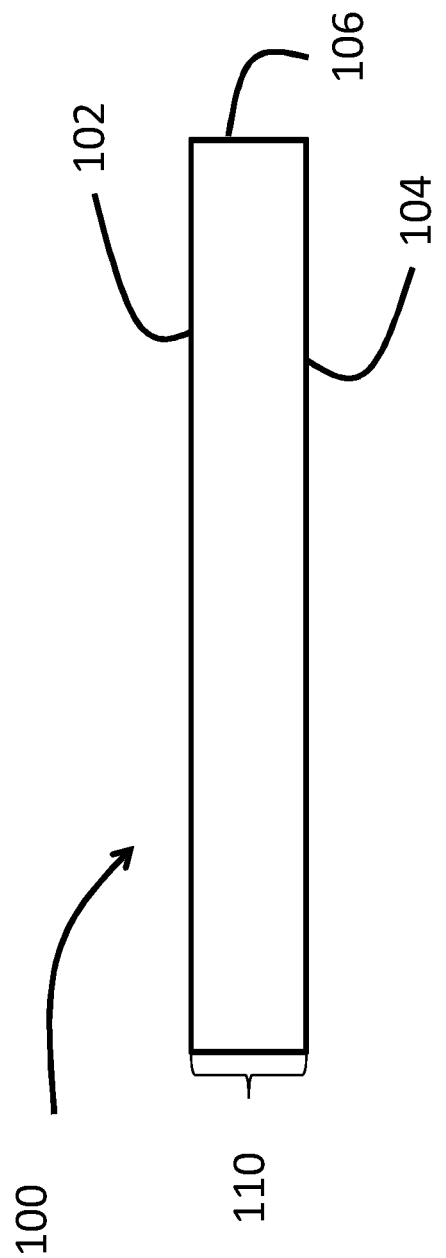
FIG. 1 is a side view illustration of a glass article according to one or more embodiments.

Reference will now be made in detail to various embodiments, examples of which are illustrated in the accompanying drawings.

Aspects of this disclosure pertain to a glass article that exhibits solar performance in terms of average total solar transmittance along a wavelength range from about 300 nm to about 2500 nm ($T_{ts}$). In some instances, the solar performance of the glass article may be described in terms of specific wavelength ranges such as the average transmittance along the UV spectrum in a range from about 300 nm up to about 380 nm or 400 nm ($T_{uv\text{-}380}$ or $T_{uv\text{-}400}$), and the average transmittance along the visible spectrum in a range from about 400 nm to about 780 nm (Tvis).

In accordance with one or more embodiments, the glass articles include a composition with certain transition metals (e.g., iron, cobalt, vanadium and nickel). In one or more embodiments, the compositions may be described as strengthenable by various methods include mechanical strengthening, chemical strengthening, thermal strengthening, or combinations of such strengthening methods. In some embodiments, the glass articles may be strengthened while controlling the redox state of iron so that average transmittance performance is maintained at glass article thicknesses of less than about 1.6 mm. In some embodiments, the glass articles may be described as tinted and exhibiting either one or more of a green or grey color.

Transition metals such as iron and cobalt have been used in glass articles for tinting, while vanadium and nickel can also be used with iron and/or cobalt to tune transmittance along certain wavelength ranges. The compositions of glass articles can affect the redox equilibrium of iron by influencing the state of solvation or coordination of iron, which affects color and absorption along specific wavelength ranges. When iron is added to peralkaline glass compositions a green tint; however, charge balanced glass compositions will develop grey-brown tints. In one or more embodiments, the glass articles maintain the redox equilibrium of iron by choice of raw materials, for example choice of iron source, reduced iron (i.e. iron oxalate) or oxidized iron (iron trioxide).

As will be discussed in more detail, the glass articles described herein can be used in laminates for applications that require certain solar performance and can eliminate the need for polymer interlayers or other materials that absorb UV light. Moreover, the glass articles described herein can achieve solar transmission performance at reduced thicknesses, which is comparable to a thicker soda-lime glass articles having a thickness from about 1.6 mm to about 2.5 mm. Accordingly, such glass articles can provide significant weight reduction while still providing solar performance.

A first aspect of this disclosure pertains to a glass article that exhibits a grey tint. In one or more embodiments, the glass exhibits an average total solar transmittance of about 88% or less, over a wavelength range from about 300 nm to about 2500 nm, when the glass article has a thickness of 0.7 mm. In one or more embodiments, this glass article comprises a glass composition comprising $SiO_2$ in an amount in the range from about 40 mol % to about 80 mol %, $Al_2O_3$ in an amount greater than about 4 mol %, a non-zero amount of alkali metal oxides ($R_2O$), wherein the glass composition exhibits a difference between $R_2O$ and the amount of $Al_2O_3$ in the range from about -0.5 to about 1.5; and Fe expressed as $Fe_2O_3$, wherein Fe is present in an amount up to about 1 mol %. In one or more embodiments, the glass composition includes CaO in an amount less than about 6 mol %, and either one of or both of $B_2O_3$ and MgO.

A second aspect of this disclosure pertains to a glass article that exhibits a green tint. In one or more embodiments, this glass article comprises a glass composition comprising $SiO_2$ in an amount in the range from about 40 mol % to about 80 mol %, $Al_2O_3$ in an amount greater than about 4 mol %, a non-zero amount of alkali metal oxides ($R_2O$), wherein the glass composition exhibits a compositional ratio of $R_2O$ to $Al_2O_3$ equal to or greater than about 1, $Na_2O$, MgO in an amount in the range from about 0 to about 13 mol %, any one of $K_2O$, $SnO_2$ and $TiO_2$, and a compositional ratio of $Na_2O$ to $K_2O$ that is greater than about 10.

In one or more embodiments, the glass composition includes $SiO_2$ in an amount in the range from about 40 mol % to about 80 mol %, from about 42 mol % to about 80 mol %, from about 44 mol % to about 80 mol %, from about 46 mol % to about 80 mol %, from about 48 mol % to about 80 mol %, from about 50 mol % to about 80 mol %, from about 52 mol % to about 80 mol %, from about 54 mol % to about 80 mol %, from about 56 mol % to about 80 mol %, from about 58 mol % to about 80 mol %, from about 60 mol % to about 80 mol %, from about 62 mol % to about 80 mol %, from about 64 mol % to about 80 mol %, from about 65 mol % to about 80 mol %, from about 66 mol % to about 80 mol %, from about 68 mol % to about 80 mol %, from about 70 mol % to about 80 mol %, from about 40 mol % to about 78 mol %, from about 40 mol % to about 76 mol %, from about 40 mol % to about 75 mol %, from about 40 mol % to about 74 mol %, from about 40 mol % to about 72 mol %, from about 40 mol % to about 70 mol %, from about 40 mol % to about 68 mol %, from about 40 mol % to about 66 mol %, from about 40 mol % to about 65 mol %, from about 40 mol % to about 64 mol %, from about 40 mol % to about 62 mol %, from about 40 mol % to about 60 mol %, from about 60 mol % to about 75 mol %, from about 62 mol % to about 75 mol %, from about 64 mol % to about 75 mol %, from about 65 mol % to about 75 mol %, or from about 67 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 4 mol % to about 20 mol %, from about 5 mol % to about 20 mol %, from about 6 mol % to about 20 mol %, from about 8 mol % to about 20 mol %, from about 10 mol % to about 20 mol %, from about 12 mol % to about 20 mol %, from about 14 mol % to about 20 mol %, from greater than about 4 mol % to about 18 mol %, from greater than about 4 mol % to about 16 mol %, from greater than about 4 mol % to about 15 mol %, from greater than about 4 mol % to about 14 mol %, from greater than about 4 mol % to about 12 mol %, from 5 mol % to about 18 mol %, from 5 mol % to about 16 mol %, from 5 mol % to about 15 mol %, from 5 mol % to about 14 mol %, from 5 mol % to about 13 mol %, from about 5 mol % to about 12 mol %, from 6 mol % to about 18 mol %, from 6 mol % to about 16 mol %, from 6 mol % to about 15 mol %, from 6 mol % to about 14 mol %, from 6 mol % to about 13 mol %, from about 6 mol % to about 12 mol %, from 8 mol % to about 16 mol %, from 8 mol % to about 14 mol %, from 10 mol % to about 16 mol %, or from 11 mol % to about 14 mol % and all ranges and sub-ranges therebetween.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than 0 mol %. In some embodiments, the glass composition includes a total amount of $R_2O$ in a range from 0.1 mol % to about 20 mol %, from 0.1 mol % to about 18 mol %, from 0.1 mol % to about 16 mol %, from 0.1 mol % to about 14 mol %, from 0.1 mol % to about 12 mol %, from about 1 mol % to about 20 mol %, from about 1 mol % to about 18 mol %, from about 1 mol % to about 16 mol %, from about 1 mol % to about 14 mol %, from about 1 mol % to about 12 mol %, from about 4 mol % to about 20 mol %, from about 4 mol % to about 18 mol %, from about 4 mol % to about 16 mol %, from about 4 mol % to about 14 mol %, from about 4 mol % to about 12 mol %, from about 6 mol % to about 20 mol %, from about 6 mol % to about 18 mol %, from about 6 mol % to about 16 mol %, from about 6 mol % to about 14 mol %, from about 6 mol % to about 12 mol %, from about 8 mol % to about 20 mol %, from about 8 mol % to about 18 mol %, from about 8 mol % to about 16 mol %, from about 8 mol % to about 14 mol %, from about 8 mol % to about 12 mol %, from about 10 mol % to about 20 mol %, from about 10 mol % to about 18 mol %, from about 10 mol % to about 16 mol %, from about 10 mol % to about 14 mol %, or from about 10 mol % to about 12 mol % and all ranges and sub-ranges therebetween. In one or more embodiments, the glass composition may be substantially free of $Rb_2O$, $Cs_2O$ or both $Rb_2O$ and $Cs_2O$. As used herein, the phrase "substantially free" with respect to the components of the composition means that the component is not actively or intentionally added to the composition during initial batching, but may be present as an impurity in an amount less than about 0.001 mol %.

In one or more embodiments, the glass composition includes $Li_2O$ in an amount greater than or equal to about 1 mol %, greater than or equal to about 2 mol %, greater than or equal to about 3 mol %, or greater than or equal to about 4 mol %. In one or more embodiments, the composition includes $Li_2O$ in a range from about 0 mol % to about 10 mol %, from about 0 mol % to about 9 mol %, from about 0 mol % to about 8 mol %, from about 0 mol % to about 7 mol %, from about 0 mol % to about 6 mol %, from about 0 mol % to about 5 mol %, from about 0.1 mol % to about 10 mol %, from about 0.1 mol % to about 9 mol %, from about 0.1 mol % to about 8 mol %, from about 0.1 mol % to about 7 mol %, from about 0.1 mol % to about 6 mol %, from about 0.1 mol % to about 5 mol %, from about 1 mol % to about 10 mol %, from about 1 mol % to about 9 mol %, from about 1 mol % to about 8 mol %, from about 1 mol % to about 7 mol %, from about 1 mol % to about 6 mol %, from about 1 mol % to about 5 mol %, from about 2 mol % to about 8 mol %, from about 3 mol % to about 6 mol %, or from about 4 mol % to about 6 mol %, and all ranges and sub-ranges therebetween. In one or more embodiments, the glass composition is substantially free of $Li_2O$.

In one or more embodiments, the glass composition comprises $Na_2O$ in an amount greater than or equal to about 1 mol %, greater than or equal to about 2 mol %, greater than or equal to about 3 mol %, or greater than or equal to about 4 mol %. In one or more embodiments, the composition includes $Na_2O$ in a range from about from about 1 mol % to about 14 mol %, from about 1 mol % to about 13 mol %, from about 1 mol % to about 12 mol %, from about 1 mol % to about 11 mol %, from about 1 mol % to about 10 mol %, from about 1 mol % to about 9 mol %, from about 1 mol % to about 8 mol %, from about 1 mol % to about 7 mol %, from about 1 mol % to about 6 mol %, from about 1 mol % to about 5 mol %, from about 2 mol % to about 14 mol %, from about 3 mol % to about 14 mol %, from about 4 mol % to about 14 mol %, from about 5 mol % to about 14 mol %, from about 6 mol % to about 14 mol %, from about 7 mol % to about 14 mol %, from about 4 mol % to about 12 mol %, or from about 4 mol % to about 10 mol %, and all ranges and sub-ranges therebetween.

In one or more embodiments, the glass composition includes less than about 2 mol % $K_2O$. In some instances, the glass composition may include $K_2O$ in an amount in a range from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, or from about 0 mol % to about 0.1 mol % and all ranges and sub-ranges therebetween. In one or more embodiments, the glass composition may be substantially free of $K_2O$.

In one or more embodiments, the glass composition may optionally comprise $K_2O$ and when the glass composition includes $K_2O$ it is present in an amount of 1 mol % or greater (e.g., from about 1 mol % to about 2 mol %). In some embodiments, the glass composition exhibits the compositional ratio of $Na_2O:K_2O$ that is greater than 10, even when the glass composition is substantially free of $K_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition comprises the composition relationship of a difference between $R_2O$ and the amount of $Al_2O_3$ (i.e., $R_2O-Al_2O_3$) that is about 1.5 mol % or less, about 1 mol % or less, or about 0.5 mol % or less. In some embodiments, the glass composition comprises the compositional relationship $R_2O-Al_2O_3$ in the range from about −0.5 to about 1.5 (in mol %). In some embodiments, the glass composition comprises the composition relationship $R_2O-Al_2O_3$ in a range from about −0.5 to about 1.4, from about −0.5 to about 1.2, from about −0.5 to about 1, from about −0.5 to about 0.9, from about −0.5 to about 0.8, from about −0.5 to about 0.7, from about −0.5 to about 0.6 from about −0.5 to about 0.5, from about −0.5 to about 0.4, from about −0.4 to about 1.5, from about −0.3 to about 1.5, from about −0.2 to about 1.5, from about −0.1 to about 1.5, from about 0 to about 1.5, from about 0.1 to about 1.5, from about 0.2 to about 1.5, from about 0.3 to about 1.5, from about 0.4 to about 1.5, from about 0.2 to about 1, or from about 0.3 to about 0.7, and all ranges and sub-ranges therebetween, all in mol %.

In one or more embodiments, the glass composition comprises the compositional ratio (in mol %) of $R_2O$ to $Al_2O_3$ (i.e., $R_2O:Al_2O_3$) that is about 1.5 or less, about 1 or less, or about 0.5 or less. In some embodiments, the glass composition comprises the compositional ratio $R_2O:Al_2O_3$ in the range from about 0 to about 1.5. In some embodiments, the glass composition comprises the compositional ratio $R_2O:Al_2O_3$ in a range from about 0 to about 1.4, from about 0 to about 1.2, from about 0 to about 1, from about 0 to about 0.9, from about 0 to about 0.8, from about 0.1 to about 1.5, from about 0.2 to about 1.5, from about 0.3 to about 1.5, from about 0.4 to about 1.5, from about 0.5 to about 1.5, from about 0.6 to about 1.5, from about 0.7 to about 1.5, from about 0.8 to about 1.5, from about 0.9 to about 1.5, from about 0.5 to about 1.4, from about 0.5 to about 1.3, from about 0.5 to about 1.2, from about 0.5 to about 1.1, from about 0.5 to about 1, or from about 0.8 to about 1.2, and all ranges and sub-ranges therebetween.

In one or more embodiments, the glass composition comprises the compositional ratio (in mol %) of $R_2O$ to $Al_2O_3$ (i.e., $R_2O:Al_2O_3$) that is about 1 or greater, or about 1.5 or greater. In some embodiments, the glass composition comprises the compositional ratio $R_2O:Al_2O_3$ in the range from about 1 to about 12, from about 1 to about 11, from about 1 to about 10, from about 1 to about 9, from about 1 to about 8, from about 1 to about 7, from about 1.2 to about 12, from about 1.5 to about 12, from about 2 to about 12, from about 3 to about 12, from about 4 to about 12, from about 5 to about 12, from about 6 to about 12, from about 1.2 to about 10, from about 1.5 to about 10, from about 2 to about 10, from about 3 to about 10, from about 4 to about 10, from about 5 to about 10, from about 6 to about 10, from about 1 to about 3, from about 1.2 to about 3, from about 1.4 to about 3, from about 1.5 to about 3, from about 1.6 to about 3, from about 1.8 to about 3, from about 1 to about 2.8, from about 1 to about 2.6, from about 1 to about 2.5, from about 1 to about 2.4, from about 1 to about 2.2, from about 1 to about 2, from about 1 to about 1.8, from about 1 to about 1.6, from about 1 to about 1.5, from about 1 to about 1.5, or from about 1 to about 1.5, and all ranges and sub-ranges therebetween.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises Fe expressed as $Fe_2O_3$ in a range from about 0 mol % to about 1 mol %, from about 0 mol % to about 0.9 mol %, from about 0 mol % to about 0.8 mol %, from about 0 mol % to about 0.7 mol %, from about 0 mol % to about 0.6 mol %, from about 0 mol % to about 0.5 mol %, from about 0 mol % to about 0.4 mol %, from about 0 mol % to about 0.3 mol %, from about 0 mol % to about 0.2 mol %, 0 mol % to about 0.1 mol %, from about 0.01 mol % to about 0.9 mol %, from about 0.01 mol % to about 0.8 mol %, from about 0.01 mol % to about 0.7 mol %, from about 0.01 mol % to about 0.6 mol %, from about 0.01 mol % to about 0.5 mol %, from about 0.01 mol % to about 0.4 mol %, from about 0.01 mol % to about 0.3 mol %, from about 0.01 mol % to about 0.2 mol %, from about 0.05 mol % to about 0.1 mol %, from about 0.1 mol % to about 1 mol %, from about 0.2 mol % to about 1 mol %, from about 0.3 mol % to about 1 mol %, from about 0.4 mol % to about 1 mol %, from about 0.5 mol % to about 1 mol %, from about 0.6 mol % to about 1 mol %, from about 0.2 mol % to about 0.8 mol %, or from about 0.4 to about 0.8 mol % and all ranges and sub-ranges therebetween. In one or more embodiments, the Fe source may be oxalate/I2, $Fe_2O_3$/I8. In some embodiments, the about of Fe expressed as $Fe_2O_3$ is expressed in weight % in a range from about 0.1 weight % to about 5 weight %, from about 0.1 weight % to about 4 weight %, from about 0.1 weight % to about 3 weight %, from about 0.1 weight % to about 2.5 weight %, from about 0.2 weight % to about 5 weight %, from about 0.3 weight % to about 5 weight %, or from about 0.4 weight % to about 5 weight %, and all ranges and sub-ranges therebetween.

In one or more embodiments, the glass composition comprises $B_2O_3$ (e.g., about 0.01 mol % or greater). In some embodiments, the glass composition may be substantially free of $B_2O_3$. In one or more embodiments, the glass composition comprises $B_2O_3$ in an amount in a range from about 1 mol % to about 14 mol %, from about 2 mol % to about 14 mol %, from about 4 mol % to about 14 mol %, from about 5 mol % to about 14 mol %, from about 6 mol % to about 14 mol %, from about 8 mol % to about 14 mol %, from about 1 mol % to about 13 mol %, from about 1 mol % to about 12 mol %, from about 1 mol % to about 11 mol %, from about 1 mol % to about 10 mol %, from about 1 mol % to about 9 mol %, from about 1 mol % to about 8 mol %, from about 2 mol % to about 12 mol %, from about 4 mol % to about 12 mol %, or from about 6 mol % to about 10 mol %, and all ranges and sub-ranges therebetween.

In one or more embodiments, the glass composition may include a total amount of RO (which is the total amount of alkaline earth metal oxide such as CaO, MgO, BaO, ZnO and SrO) that is less than about 6 mol %, less than about 5 mol %, or less than about 4.5 mol %. In one or more embodiments, the glass composition is substantially free of RO. In one or more embodiments, the glass composition comprises RO in an amount from about 0 mol % to about 6 mol %, from about 0 mol % to about 5 mol %, from about 0 mol % to about 4 mol %, from about 0 mol % to about 4.5 mol %, from about 0 mol % to about 3 mol %, from about 0 mol % to about 2 mol %, from about 0 mol % to about 1 mol %, from about 0.1 mol % to about 6 mol %, from about 0.5 mol % to about 6 mol %, from about 1 mol % to about 6 mol %, from about 2 mol % to about 6 mol %, from about 3 mol % to about 6 mol %, from about 4 mol % to about 6 mol %, from about 5 mol % to about 6 mol %, from about 0 mol % to about 4.5 mol %, from about 0.1 mol % to about 4.5 mol %, from about 0.5 mol % to about 4.5 mol %, from about 1 mol % to about 4.5 mol %, from about 2 mol % to about 4.5 mol %, or from about 3 mol % to about 4.5 mol %, and all ranges and sub-ranges therebetween.

In one or more embodiments, the glass composition includes CaO in an amount less than about 6 mol %, less than about 5 mol %, or less than about 4.5 mol %. In one or more embodiments, the glass composition is substantially free of CaO. In one or more embodiments, the glass composition comprises CaO in an amount from about 0 mol % to about 6 mol %, from about 0 mol % to about 5 mol %, from about 0 mol % to about 4 mol %, from about 0 mol % to about 4.5 mol %, from about 0 mol % to about 3 mol %, from about 0 mol % to about 2 mol %, from about 0 mol % to about 1 mol %, from about 0.1 mol % to about 6 mol %, from about 0.5 mol % to about 6 mol %, from about 1 mol % to about 6 mol %, from about 2 mol % to about 6 mol %, from about 3 mol % to about 6 mol %, from about 4 mol % to about 6 mol %, from about 5 mol % to about 6 mol %, from about 0 mol % to about 4.5 mol %, from about 0.1 mol % to about 4.5 mol %, from about 0.5 mol % to about 4.5 mol %, from about 1 mol % to about 4.5 mol %, from about 2 mol % to about 4.5 mol %, or from about 3 mol % to about 4.5 mol %, and all ranges and sub-ranges therebetween.

In some embodiments, the glass composition comprises MgO in an amount in the range from about 0 to about 13 mol %, from about 0 mol % to about 10 mol %, from about 0 to about 8 mol %, from about 0 to about 6 mol %, from about 0 to about 5 mol %, from about 0 to about 4 mol %, from about 0 to about 3 mol %, from about 0 to about 2 mol %, from about 0.1 to about 13 mol %, from about 0.1 mol % to about 10 mol %, from about 0.1 to about 8 mol %, from about 0.1 to about 6 mol %, from about 0.1 to about 5 mol %, from about 0.1 to about 4 mol %, from about 0.1 to about 3 mol %, or from about 0.1 to about 2 mol %, from about 1 to about 13 mol %, from about 1 mol % to about 10 mol %, from about 1 to about 8 mol %, from about 1 to about 6 mol %, from about 1 to about 5 mol %, from about 1 to about 4 mol %, from about 1 to about 3 mol %, or from about 1 to about 2 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises a total amount of Co, expressed as $Co_3O_4$, in an amount in the range from about 0.001 mol % to 0.01 mol %, from about 0.002 mol % to 0.01 mol %, from about 0.003 mol % to 0.01 mol %, from about 0.004 mol % to 0.01 mol %, from about 0.005 mol % to 0.01 mol %, from about 0.006 mol % to 0.01 mol %, from about 0.007 mol % to 0.01 mol %, from about 0.001 mol % to 0.009 mol %, from about 0.001 mol % to 0.008 mol %, from about 0.001 mol % to 0.007 mol %, from about 0.001 mol % to 0.006 mol %, or from about 0.001 mol % to 0.005 mol %, and all ranges and sub-ranges therebetween.

The glass composition of one or more embodiments may include any one or more of NiO, $V_2O_5$, and $TiO_2$.

Where the glass composition includes $TiO_2$, $TiO_2$ may be present in an amount of about 5 mol % or less, about 2.5 mol % or less, about 2 mol % or less or about 1 mol % or less.

In one or more embodiments, the glass composition may be substantially free of $TiO_2$.

Where the glass composition includes NiO, NiO may be present in an amount of about 0.6 mol % or less, or about 0.1 mol % or less. In one or more embodiments, the glass composition may be substantially free of NiO. In one or more embodiments, the glass composition may be substantially free of $V_2O_5$. In one or more embodiments, the glass composition may be substantially free of $TiO_2$. In one or more embodiments, the glass composition may be substantially free of any two or all three of NiO, $V_2O_5$, and $TiO_2$.

In one or more embodiments, the glass composition may include less than about 0.9 mol % CuO (e.g., less than about 0.5 mol %, less than about 0.1 mol %, or less than about 0.01 mol %). In some embodiments, the glass composition is substantially free of CuO.

In one or more embodiments, the glass composition may include less than about 0.2 mol % Se (e.g., less than about 0.1 mol %, or less than about 0.01 mol %). In some embodiments, the glass composition is substantially free of Se.

In one or more embodiments, the glass composition by substantially free of $ZrO_2$.

In one or more embodiments, the glass composition (or article formed therefrom) comprises a liquidus viscosity that enables the formation of the glass articles via specific techniques. As used herein, the term "liquidus viscosity" refers to the viscosity of a molten glass at the liquidus temperature, wherein the term "liquidus temperature" refers to the temperature at which crystals first appear as a molten glass cools down from the melting temperature (or the temperature at which the very last crystals melt away as temperature is increased from room temperature).

In one or more embodiments, the glass composition (or the glass article formed therefrom) exhibits a liquidus viscosity in the range from about 100 kilopoise (kP) to about 500 kP. In some embodiments, the glass composition (or the glass article formed therefrom) exhibits a liquidus viscosity of less than about 300 kP or less. In some embodiments, the glass composition (or the glass article formed therefrom) exhibits a liquidus viscosity of about 250 kP or less, about 200 kP or less, or about 180 kP or less. In some embodiments, the glass composition (or the glass article formed therefrom) exhibits a liquidus viscosity of greater than about 300 kP. In some embodiments, the glass composition (or the glass article formed therefrom) exhibits a liquidus viscosity of about 350 kP or greater, about 400 kP or greater, about 450 kP or greater, about 500 kP or greater, about 750 kP or greater, about 1000 kP or greater, or about 2000 kP or greater.

In one or more embodiments, the glass article exhibits CTE measured over a temperature range from about 20° C. to about 300° C. in the range from about $55 \times 10^{-7}$ ppm/° C. to about $80 \times 10^{-7}$ ppm/° C., from about $58 \times 10^{-7}$ ppm/° C. to about $80 \times 10^{-7}$ ppm/° C., or from about $60 \times 10^{-7}$ ppm/° C. to about $80 \times 10^{-7}$ ppm/° C.

In some embodiments, the glass article exhibits CTE a high temperature (or liquid) CTE in the range from about $8 \times 10^{-7}$ ppm/° C. to about $18 \times 10^{-7}$ ppm/° C., from about $10 \times 10^{-7}$ ppm/° C. to about $18 \times 10^{-7}$ ppm/° C., from about $12 \times 10^{-7}$ ppm/° C. to about $18 \times 10^{-7}$ ppm/° C., from about $8 \times 10^{-7}$ ppm/° C. to about $16 \times 10^{-7}$ ppm/° C., from about $8 \times 10^{-7}$ ppm/° C. to about $14 \times 10^{-7}$ ppm/° C., from about $8 \times 10^{-7}$ ppm/° C. to about $12 \times 10^{-7}$ ppm/° C. or from about $8 \times 10^{-7}$ ppm/° C. to about $10 \times 10^{-7}$ ppm/° C.

In one or more embodiments, the glass article exhibits a Young's modulus in the range from about 70 GPa to about 85 GPa, from about 72 GPa to about 85 GPa, from about 74 GPa to about 85 GPa, from about 75 GPa to about 85 GPa, from about 76 GPa to about 85 GPa, from about 70 GPa to about 80 GPa, from about 72 GPa to about 80 GPa, from about 74 GPa to about 80 GPa, from about 75 GPa to about 80 GPa, from about 76 GPa to about 80 GPa, from about 70 GPa to about 78 GPa, from about 70 GPa to about 76 GPa, from about 70 GPa to about 75 GPa, from about 72 GPa to about 78 GPa, from about 75 GPa to about 79 GPa, or from about 70 GPa to about 77 GPa.

Referring to FIG. 1, embodiments of the glass article 100 include a first major surface 102, an opposing second major surface 104 defining a thickness t 110 between the first major surface and the second major surface.

In one or more embodiments, the thickness t may be about 3 millimeters or less (e.g., in the range from about 0.01 millimeter to about 3 millimeters, from about 0.1 millimeter to about 3 millimeters, from about 0.2 millimeter to about 3 millimeters, from about 0.3 millimeter to about 3 millimeters, from about 0.4 millimeter to about 3 millimeters, from about 0.01 millimeter to about 2.5 millimeters, from about 0.01 millimeter to about 2 millimeters, from about 0.01 millimeter to about 1.5 millimeters, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter.)

Figure 2:
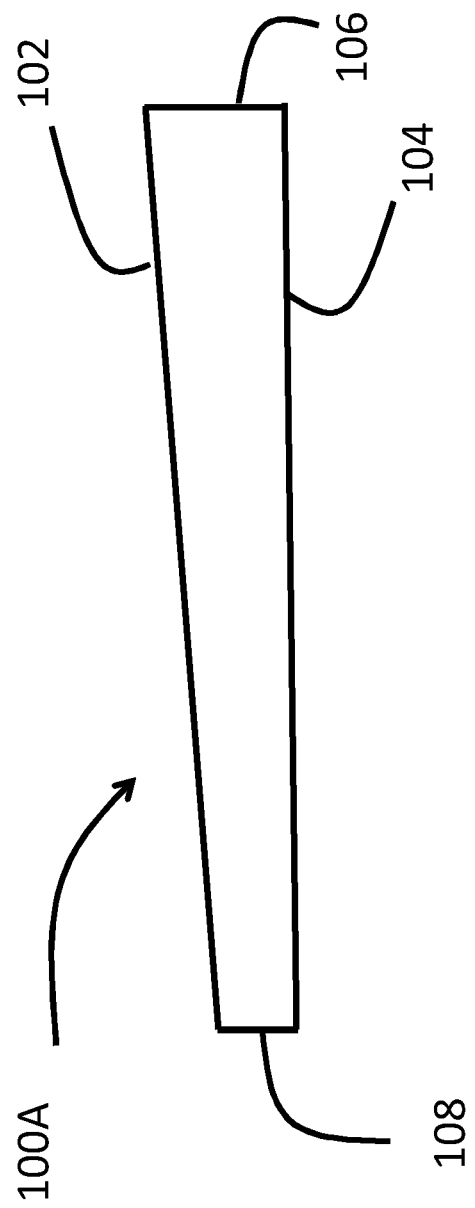
FIG. 2 is a side view illustration of a glass article according to one or more embodiments.

The glass article may be substantially planar sheet, although other embodiments may utilize a curved or otherwise shaped or sculpted article. In some instances, the glass article may have a 3D or 2.5D shape. Additionally or alternatively, the thickness of the glass article may be constant along one or more dimension or may vary along one or more of its dimensions for aesthetic and/or functional reasons. For example, the edges of the glass article may be thicker as compared to more central regions of the glass article. The length, width and thickness dimensions of the glass article may also vary according to the article application or use. In some embodiments, the glass article 100A may have a wedged shape in which the thickness at one minor surface 106 is greater than the thickness at an opposing minor surface 108, as illustrated in FIG. 2. Where the thickness varies, the thickness ranges disclosed herein are the maximum thickness between the major surfaces.

The glass article may have a refractive index in the range from about 1.45 to about 1.55. As used herein, the refractive index values are with respect to a wavelength of 550 nm.

The glass article may be characterized by the manner in which it is formed. For instance, where the glass article may be characterized as float-formable (i.e., formed by a float process), down-drawable and, in particular, fusion-formable or slot-drawable (i.e., formed by a down draw process such as a fusion draw process or a slot draw process).

Some embodiments of the glass articles described herein may be formed by a float process. A float-formable glass article may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass article that can be lifted from the tin onto rollers. Once off the bath, the glass article can be cooled further and annealed to reduce internal stress.

Some embodiments of the glass articles described herein may be formed by a down-draw process. Down-draw processes produce glass articles having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass articles may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass articles described herein may be formed by a slot draw process. The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In one or embodiments, the glass articles described herein may exhibit an amorphous microstructure and may be substantially free of crystals or crystallites. In other words, the glass articles exclude glass-ceramic materials.

In one or more embodiments, the glass article exhibits an average total solar transmittance of about 88% or less, over a wavelength range from about 300 nm to about 2500 nm, when the glass article has a thickness of 0.7 mm. For example, the glass article exhibits an average total solar transmittance in a range from about 60% to about 88%, from about 62% to about 88%, from about 64% to about 88%, from about 65% to about 88%, from about 66% to about 88%, from about 68% to about 88%, from about 70% to about 88%, from about 72% to about 88%, from about 60% to about 86%, from about 60% to about 85%, from about 60% to about 84%, from about 60% to about 82%, from about 60% to about 80%, from about 60% to about 78%, from about 60% to about 76%, from about 60% to about 75%, from about 60% to about 74%, or from about 60% to about 72%.

In one or embodiments, the glass article exhibits an average transmittance in the range from about 75% to about 85%, at a thickness of 0.7 mm or 1 mm, over a wavelength range from about 380 nm to about 780 nm. In some embodiments, the average transmittance at this thickness and over this wavelength range may be in a range from about 75% to about 84%, from about 75% to about 83%, from about 75% to about 82%, from about 75% to about 81%, from about 75% to about 80%, from about 76% to about 85%, from about 77% to about 85%, from about 78% to about 85%, from about 79% to about 85%, or from about 80% to about 85%. In one or more embodiments, the glass article exhibits $T_{uv\text{-}380}$ or $T_{uv\text{-}400}$ of 50% or less (e.g., 49% or less, 48% or less, 45% or less, 40% or less, 30% or less, 25% or less, 23% or less, 20% or less, or 15% or less), at a thickness of 0.7 mm or 1 mm, over a wavelength range from about 300 nm to about 400 nm.

In one or more embodiments, the glass article exhibits a grey tint or color in transmittance. In one or more embodiments, the glass article (at a thickness of 1 mm or 0.7 mm) exhibits color coordinates in transmittance, under CIE L*a*b* (CIELAB) color space, under a D65 illuminant, wherein a* is in the range from about −2 to about 5, b* is in the range from about −1 to about 10, and L* is in the range from about 55 to about 98. In one or more embodiments, the glass article (at a thickness of 1 mm or 0.7 mm) exhibits a delta E value in transmittance (under CIE L*a*b* (CIELAB) color space and a D65 illuminant defined by equation (1)) of less than 1.5, about 1.4 or less, about 1.3 or less, about 1.2 or less, about 1.1 or less, or about 1 or less.

$$\text{Delta } E=\sqrt{((92-L^*)^2+(-4.5-a^*)^2+(1-b^*)^2)} \qquad \text{Equation (1)}$$

In one or more embodiments, the glass article (at a thickness of 1 mm or 0.7 mm) exhibits color coordinates in transmittance, under CIE L*a*b* (CIELAB) color space, under a D65 illuminant, wherein L* is in the range from about 55 to about 98, from about 56 to about 98, from about 58 to about 98, from about 60 to about 98, from about 62 to about 98, from about 64 to about 98, from about 65 to about 98, from about 66 to about 98, from about 68 to about 98, from about 70 to about 98, from about 72 to about 98, from about 74 to about 98, from about 75 to about 98, from about 55 to about 96, from about 55 to about 95, from about 55 to about 94, from about 55 to about 92, from about 55 to about 90, from about 55 to about 88, from about 55 to about 86, from about 55 to about 85, from about 55 to about 84, from about 55 to about 82, from about 55 to about 80, from about 55 to about 78, or from about 55 to about 75.

In one or more embodiments, the glass article (at a thickness of 1 mm or 0.7 mm) exhibits color coordinates in transmittance, under CIE L*a*b* (CIELAB) color space, under a D65 illuminant, wherein a* is in a range from about −2 to about 5, from about −1.8 to about 5, from about −1.6 to about 5, from about −1.5 to about 5, from about −1.4 to about 5, from about −1.2 to about 5, from about −1 to about 5, from about 0.5 to about 5, from about 1 to about 5, from about 2 to about 5, from about −2 to about 4.8, from about −2 to about 4.6, from about −2 to about 4.5, from about −2 to about 4.4, from about −2 to about 4.2, from about −2 to about 4, from about −2 to about 3.5, from about −2 to about 3, from about −2 to about 2.5, or from about −2 to about 2.

In one or more embodiments, the glass article (at a thickness of 1 mm or 0.7 mm) exhibits color coordinates in transmittance, under CIE L*a*b* (CIELAB) color space, under a D65 illuminant, wherein b* is in a range from about −1 to about 10, from about −1 to about 9, from about −1 to about 8, from about −1 to about 7, from about −1 to about 6, from about −1 to about 5, from about −0.5 to about 10, from about 0 to about 10, from about 0.5 to about 10, from about 1 to about 10, from about 2 to about 10, from about 3 to about 10, from about 4 to about 10, or from about 5 to about 10.

In one or more embodiments, the glass article may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

CS and DOC are measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. CT may be approximated using the equation (2.

$$CT=(CS \cdot DOC)/(t-2DOC) \qquad \text{Equation (2).}$$

CT and CS are expressed herein in megaPascals (MPa), and DOC is expressed in micrometers (μm).

In one embodiment, a strengthened glass article can have a surface CS value in the range from about 50 MPa to about 800 MPa (e.g., about 100 MPa or greater, about 150 MPa or greater, about 200 MPa or greater, of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, or 750 MPa or greater).

The strengthened glass article may have a DOC in the range from about 35 μm to about 200 μm (e.g., 45 μm, 60 μm, 75 μm, 100 μm, 125 μm, 150 μm or greater). In one or more embodiments, the strengthened glass article may have a CT in a range from about 50 MPa to about 200 MPa.

In one or more embodiments, the glass article has one or more of the following: a surface CS of about 200 MPa to about 800 MPa, and a DOC in the range from about 40 μm to about 100 μm and a CT in a range from about 50 MPa to about 200 MPa.

In one or more embodiments, the glass article may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature below the glass transition point and then rapidly quenching.

In one or more embodiments, the glass article may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass article generate a stress.

Ion exchange processes are typically carried out by immersing a glass article in a molten salt bath (or two or more molten salt baths) containing the larger ions to be exchanged with the smaller ions in the glass article. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass article (including the structure of the article and any crystalline phases present) and the desired DOC and CS of the glass article that results from strengthening. Exemplary molten bath composition may include nitrates, sulfates, and chlorides of the larger alkali metal ion.

Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass article thickness, bath temperature and glass (or monovalent ion) diffusivity. However, temperatures and immersion times different from those described above may also be used.

In one or more embodiments, the glass articles may be immersed in a molten salt bath of 100% $NaNO_3$, 100% $KNO_3$, or a combination of $NaNO_3$ and $KNO_3$ having a temperature from about 370° C. to about 480° C. In some embodiments, the glass article may be immersed in a molten mixed salt bath including from about 5% to about 90% $KNO_3$ and from about 10% to about 95% $NaNO_3$. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass article may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass article. The spike may result in a greater surface CS value. This spike can be achieved by single bath or multiple baths, with the bath(s) having a single composition or mixed composition, due to the unique properties of the glass compositions used in the glass articles described herein.

In one or more embodiments, where more than one monovalent ion is exchanged into the glass article, the different monovalent ions may exchange to different depths within the glass article (and generate different magnitudes stresses within the glass article at different depths). The resulting relative depths of the stress-generating ions can be determined and cause different characteristics of the stress profile.

Figure 3:
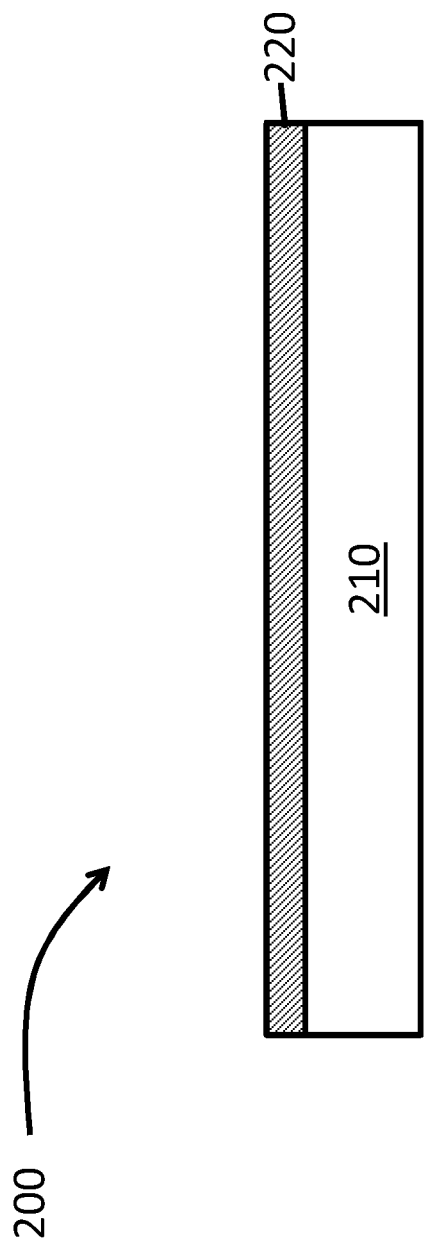
FIG. 3 is a side view illustration of a laminate including a glass article according to one or more embodiments.
Figure 4:
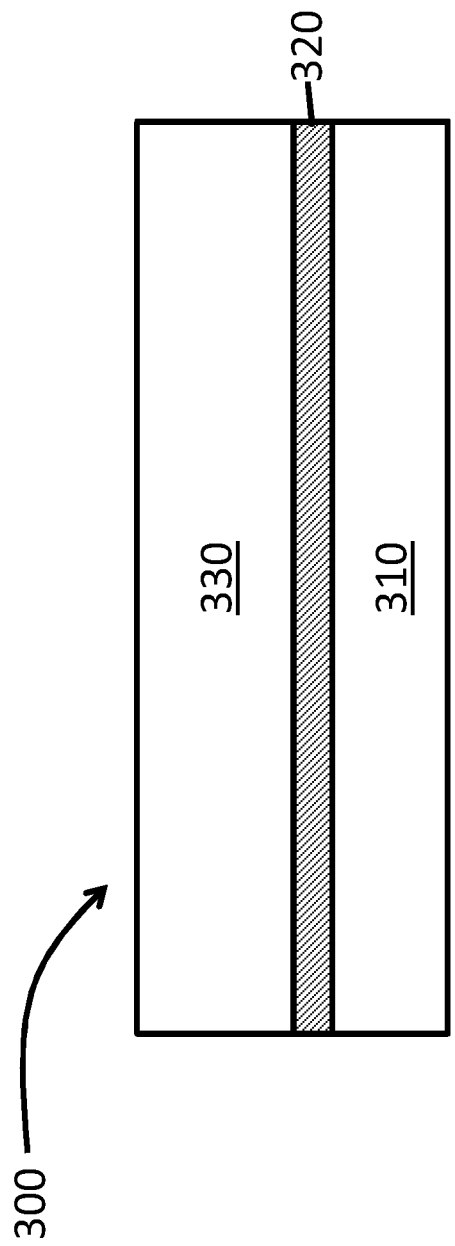
FIG. 4 is a side view illustration of a laminate including a glass article according to one or more embodiments.

A third aspect of this disclosure pertains to a laminate comprising a glass article as described herein. In one or more embodiments, the laminate 200 may include a first glass layer 210 comprising a glass article according to one or more embodiments, and an interlayer 220 disposed on the first glass layer, as illustrated in FIG. 3. As shown in FIG. 4, the laminate 300 may include a first glass layer 310, an interlayer 320 disposed on the first layer, and a second glass layer 330 disposed on the interlayer 320 opposite the first glass layer 310.

Either one of or both of the first glass layer and the second glass layer used in the laminate can include a glass article described herein. As shown in FIG. 4, the interlayer 320 is disposed between the first and second glass layers.

In one or more embodiments, the laminate 300 may include a first glass layer comprising a glass article as described herein, and a second glass layer that includes a different composition than the glass articles described herein. For example, the second glass layer may include soda-lime glass, alkali aluminosilicate glass, alkali containing borosilicate glass, alkali aluminophosphosilicate glass, or alkali aluminoborosilicate glass.

In one or more embodiments, either one of or both the first glass layer and the second glass layer comprise a thickness less than 1.6 mm (e.g., 1.55 mm or less, 1.5 mm or less, 1.45 mm or less, 1.4 mm or less, 1.35 mm or less, 1.3 mm or less, 1.25 mm or less, 1.2 mm or less, 1.15 mm or less, 1.1 mm or less, 1.05 mm or less, 1 mm or less, 0.95 mm or less, 0.9 mm or less, 0.85 mm or less, 0.8 mm or less, 0.75 mm or less, 0.7 mm or less, 0.65 mm or less, 0.6 mm or less, 0.55 mm or less, 0.5 mm or less, 0.45 mm or less, 0.4 mm or less, 0.35 mm or less, 0.3 mm or less, 0.25 mm or less, 0.2 mm or less, 0.15 mm or less, or about 0.1 mm or less). The lower limit of thickness may be 0.1 mm, 0.2 mm or 0.3 mm. In some embodiments, the thickness of either one of or both the first glass layer and the second glass layer is in the range from about 0.1 mm to less than about 1.6 mm, from about 0.1 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1 mm, from about 0.1 mm to about 0.9 mm, from about 0.1 mm to about 0.8 mm, from about 0.1 mm to about 0.7 mm, from about 0.1 mm, from about 0.2 mm to less than about 1.6 mm, from about 0.3 mm to less than about 1.6 mm, from about 0.4 mm to less than about 1.6 mm, from about 0.5 mm to less than about 1.6 mm, from about 0.6 mm to less than about 1.6 mm, from about 0.7 mm to less than about 1.6 mm, from about 0.8 mm to less than about 1.6 mm, from about 0.9 mm to less than about 1.6 mm, or from about 1 mm to about 1.6 mm. In some embodiments, the first glass layer and the second glass layer have substantially the same thickness as one another.

In some embodiments, while one of the first and second glass layers has a thickness less than about 1.6 mm, the other of the first and second glass layers has a thickness that is about 1.6 mm or greater. In such embodiments, the first and the second glass layers have thicknesses that differ from one another. For example, the while one of the first and second glass layers has a thickness less than about 1.6 mm, the other of the first and second glass layers has a thickness that is about 1.7 mm or greater, about 1.75 mm or greater, about 1.8 mm or greater, about 1.7 mm or greater, about 1.7 mm or greater, about 1.7 mm or greater, about 1.85 mm or greater, about 1.9 mm or greater, about 1.95 mm or greater, about 2 mm or greater, about 2.1 mm or greater, about 2.2 mm or greater, about 2.3 mm or greater, about 2.4 mm or greater, 2.5 mm or greater, 2.6 mm or greater, 2.7 mm or greater, 2.8 mm or greater, 2.9 mm or greater, 3 mm or greater, 3.2 mm or greater, 3.4 mm or greater, 3.5 mm or greater, 3.6 mm or greater, 3.8 mm or greater, 4 mm or greater, 4.2 mm or greater, 4.4 mm or greater, 4.6 mm or greater, 4.8 mm or greater, 5 mm or greater, 5.2 mm or greater, 5.4 mm or greater, 5.6 mm or greater, 5.8 mm or greater, or 6 mm or greater. In some embodiments the first or second glass layers has a thickness in a range from about 1.6 mm to about 6 mm, from about 1.7 mm to about 6 mm, from about 1.8 mm to about 6 mm, from about 1.9 mm to about 6 mm, from about 2 mm to about 6 mm, from about 2.1 mm to about 6 mm, from about 2.2 mm to about 6 mm, from about 2.3 mm to about 6 mm, from about 2.4 mm to about 6 mm, from about 2.5 mm to about 6 mm, from about 2.6 mm to about 6 mm, from about 2.8 mm to about 6 mm, from about 3 mm to about 6 mm, from about 3.2 mm to about 6 mm, from about 3.4 mm to about 6 mm, from about 3.6 mm to about 6 mm, from about 3.8 mm to about 6 mm, from about 4 mm to about 6 mm, from about 1.6 mm to about 5.8 mm, from about 1.6 mm to about 5.6 mm, from about 1.6 mm to about 5.5 mm, from about 1.6 mm to about 5.4 mm, from about 1.6 mm to about 5.2 mm, from about 1.6 mm to about 5 mm, from about 1.6 mm to about 4.8 mm, from about 1.6 mm to about 4.6 mm, from about 1.6 mm to about 4.4 mm, from about 1.6 mm to about 4.2 mm, from about 1.6 mm to about 4 mm, from about 3.8 mm to about 5.8 mm, from about 1.6 mm to about 3.6 mm, from about 1.6 mm to about 3.4 mm, from about 1.6 mm to about 3.2 mm, or from about 1.6 mm to about 3 mm.

In one or more embodiments, the laminate 200, 300 may have a thickness of 6.85 mm or less, or 5.85 mm or less, where the thickness comprises the sum of thicknesses of the first glass layer, the second glass layer (as applicable), and the interlayer. In various embodiments, the laminate may have a thickness in the range of about 1.8 mm to about 6.85 mm, or in the range of about 1.8 mm to about 5.85 mm, or in the range of about 1.8 mm to about 5.0 mm, or 2.1 mm to about 6.85 mm, or in the range of about 2.1 mm to about 5.85 mm, or in the range of about 2.1 mm to about 5.0 mm, or in the range of about 2.4 mm to about 6.85 mm, or in the range of about 2.4 mm to about 5.85 mm, or in the range of about 2.4 mm to about 5.0 mm, or in the range of about 3.4 mm to about 6.85 mm, or in the range of about 3.4 mm to about 5.85 mm, or in the range of about 3.4 mm to about 5.0 mm.

In one or more embodiments, the laminate 300, 400 exhibits radii of curvature that is less than 1000 mm, or less than 750 mm, or less than 500 mm, or less than 300 mm. The laminate, the first glass layer and/or the second glass layer are substantially free of wrinkles.

In one or more embodiments the first glass layer is relatively thin in comparison to the second glass layer. In other words, the second glass layer has a thickness greater than the first glass layer. In one or more embodiments, the second glass layer may have a thickness that is more than two times the thickness of the first glass layer. In one or more embodiments, the second glass layer may have a thickness in the range from about 1.5 times to about 2.5 times the thickness of the first glass layer.

In one or more embodiments, the first glass layer and the second glass layer may have the same thickness; however, the second glass layer is more rigid or has a greater stiffness than the first glass layer, and in very specific embodiments, both the first glass layer and the second glass layer have a thickness in the range of 0.2 mm and 1.6 mm.

In one or more embodiments, the first or second glass layer may utilize a glass article that is strengthened, as described herein. In one or more embodiments, the first glass layer comprises a strengthened glass article according to the embodiments described herein, while the second glass layer is not strengthened. In one or more embodiments, the first glass layer comprises a strengthened glass article according to the embodiments described herein, while the second glass layer is annealed. In one or more embodiments, the first glass layer is strengthened chemically, mechanically and/or thermally, while the second glass layer is strengthened in different manner than the first glass layer (chemically, mechanically and/or thermally). In one or more embodiments, the first glass layer is strengthened chemically, mechanically and/or thermally, while the second glass layer is strengthened in the same manner than the first glass layer (chemically, mechanically and/or thermally).

In one or more embodiments, the interlayer used herein (e.g., 320) may include a single layer or multiple layers. The interlayer (or layers thereof) may be formed polymers such as polyvinyl butyral (PVB), acoustic PBV (APVB), ionomers, ethylene-vinyl acetate (EVA) and thermoplastic polyurethane (TPU), polyester (PE), polyethylene terephthalate (PET) and the like. The thickness of the interlayer may be in the range from about 0.5 mm to about 2.5 mm, from about 0.8 mm to about 2.5 mm, from about 1 mm to about 2.5 mm or from about 1.5 mm to about 2.5 mm.

Figure 5:
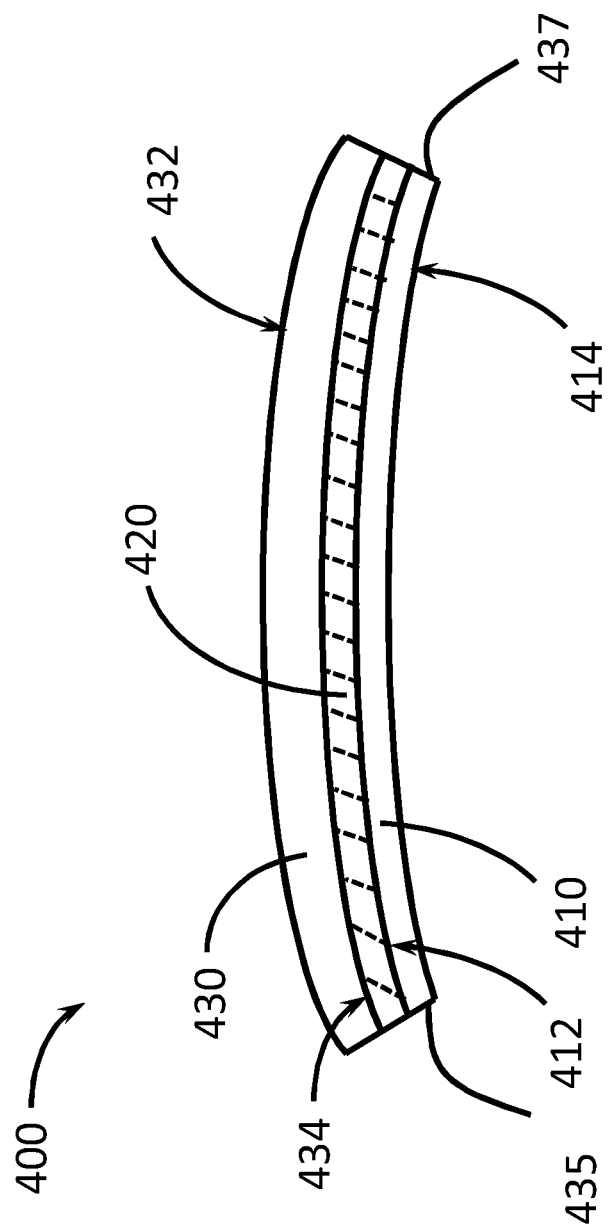
FIG. 5 is a side view illustration of a cold-formed laminate according to one or more embodiments.

In one or more embodiments, one of the first glass layer or the second glass layer may be cold-formed (with an intervening interlayer). In an exemplary cold-formed laminate shown in FIG. 5, a first glass layer 410 is laminated to a relatively thicker and curved second glass layer 430. In FIG. 5, second glass layer 430 includes a first surface 432 and a second surface 434 in contact with an interlayer 420, and the first glass layer 410 includes a third surface 412 in contact with the interlayer 420 and a fourth surface 414. An indicator of a cold-formed laminate is the fourth surface 414 has a greater surface CS than the third surface 412. Accordingly, a cold-formed laminate can comprise a high compressive stress level on fourth surface 414 making this surface more resistant to fracture.

In one or more embodiments, prior to the cold-forming process, the respective compressive stresses in the third surface 412 and fourth surface 414 are substantially equal. In one or more embodiments in which the first glass layer is unstrengthened, the third surface 412 and the fourth surface 414 exhibit no appreciable compressive stress, prior to cold-forming. In one or more embodiments in which the first glass layer 410 is strengthened (as described herein), the third surface 412 and the fourth surface 414 exhibit substantially equal compressive stress with respect to one another, prior to cold-forming. In one or more embodiments, after cold-forming, the compressive stress on the fourth surface 414 increases (i.e., the compressive stress on the fourth surface 414 is greater after cold-forming than before cold-forming). Without being bound by theory, the cold-forming process increases the compressive stress of the glass layer being shaped (i.e., the first glass layer) to compensate for tensile stresses imparted during bending and/or forming operations. In one or more embodiments, the cold-forming process causes the third surface of that glass layer (i.e., the third surface 412) to experience tensile stresses, while the fourth surface of the glass layer (i.e., the fourth surface 414) experiences compressive stresses.

When a strengthened first glass layer 410 is utilized, the third and fourth surfaces (412, 414) are already under compressive stress, and thus the third surface 412 can experience greater tensile stress. This allows for the strengthened first glass layer 410 to conform to more tightly curved surfaces.

In one or more embodiments, the first glass layer 410 has a thickness less than the second glass layer 430. This thickness differential means the first glass layer 410 is more flexible to conform to the shape of the second glass layer 430. Moreover, a thinner first glass layer 410 may deform more readily to compensate for shape mismatches and gaps created by the shape of the second glass layer 430. In one or more embodiments, a thin and strengthened first glass layer 410 exhibits greater flexibility especially during cold-forming.

In one or more embodiments, the first glass layer 410 conforms to the second glass layer 430 to provide a substantially uniform distance between the second surface 434 and the third surface 412, which is filled by the interlayer.

Figure 6:
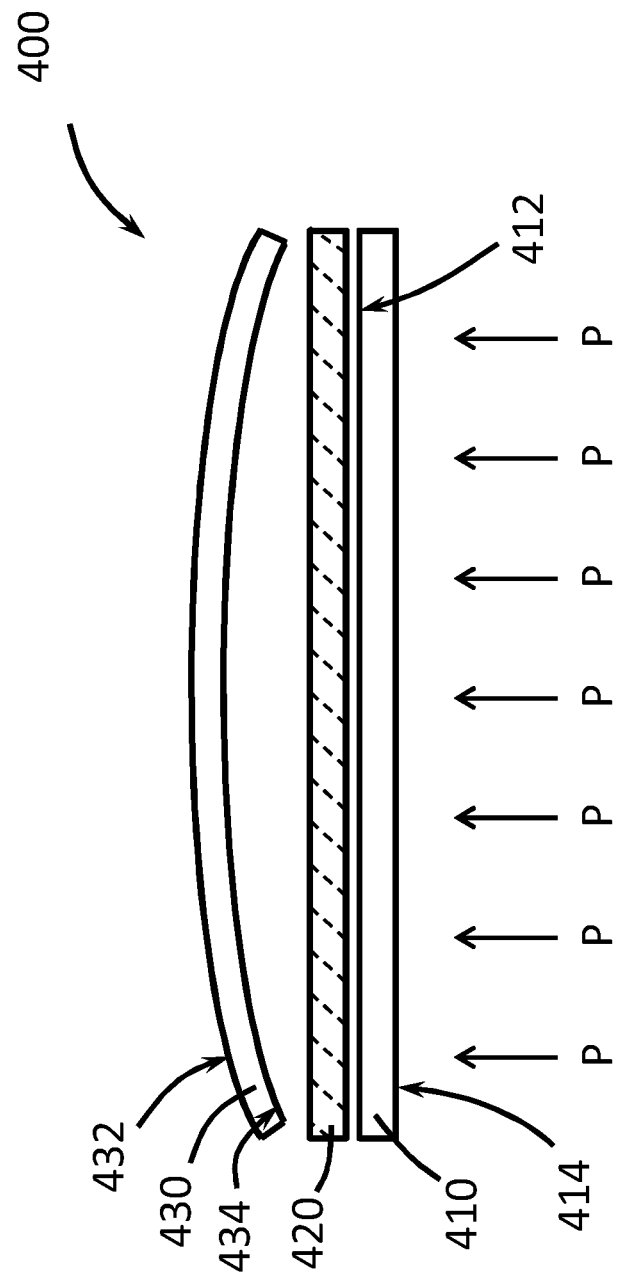
FIG. 6 is an exploded side view of the cold-formed laminate of FIG. 5.

In some non-limiting embodiments, the cold-formed laminate 400 may be formed using an exemplary cold forming process that is performed at a temperature at or just above the softening temperature of the interlayer material (e.g., 420) (e.g., about 100° C. to about 120° C.), that is, at a temperature less than the softening temperature of the respective glass layers. In one embodiment as shown in FIG. 6, the cold-formed laminate may be formed by: placing an interlayer between the second glass layer (which is curved) and a first glass layer (which may be flat) to form a stack; applying pressure to the stack to press the second glass layer against the interlayer layer which is pressed against the first glass layer; and heating the stack to a temperature below 400° C. to form the cold-formed laminate in which the second glass layer conforms in shape to the first glass layer. Such a process can occur using a vacuum bag or ring in an autoclave or another suitable apparatus. The stress of an exemplary first glass layer 410 may change from substantially symmetrical to asymmetrical according to some embodiments of the present disclosure.

As used herein, "flat" and "planar" are used interchangeably and mean a shape having curvature less than a curvature at which lamination defects are created due to curvature mismatch, when such a flat substrate is cold-formed to another substrate (i.e., a radius of curvature of greater than or equal to about 3 meters, greater than or equal to about 4 meters or greater than or equal to about 5 meters) or a curvature (of any value) along only one axis. A flat substrate has the foregoing shape when placed on a surface. As used herein "complex curve" and "complexly curved" mean a non-planar shape having curvature along two orthogonal axes that are different from one another. Examples of complexly curved shapes includes having simple or compound curves, also referred to as non-developable shapes, which include but are not limited to spherical, aspherical, and toroidal. The complexly curved laminates according to embodiments may also include segments or portions of such surfaces, or be comprised of a combination of such curves and surfaces. In one or more embodiments, a laminate may have a compound curve including a major radius and a cross curvature. A complexly curved laminate according to one or more embodiments may have a distinct radius of curvature in two independent directions. According to one or more embodiments, complexly curved laminates may thus be characterized as having "cross curvature," where the laminate is curved along an axis (i.e., a first axis) that is parallel to a given dimension and also curved along an axis (i.e., a second axis) that is perpendicular to the same dimension. The curvature of the laminate can be even more complex when a significant minimum radius is combined with a significant cross curvature, and/or depth of bend. Some laminates may also include bending along axes that are not perpendicular to one another.

As a non-limiting example, the complexly-curved laminate may have length and width dimensions of 0.5 m by 1.0 m and a radius of curvature of 2 to 2.5 m along the minor axis, and a radius of curvature of 4 to 5 m along the major axis. In one or more embodiments, the complexly-curved laminate may have a radius of curvature of 5 m or less along at least one axis. In one or more embodiments, the complexly-curved laminate may have a radius of curvature of 5 m or less along at least a first axis and along the second axis that is perpendicular to the first axis. In one or more embodiments, the complexly-curved laminate may have a radius of curvature of 5 m or less along at least a first axis and along the second axis that is not perpendicular to the first axis.

In one or more embodiments the first glass layer, the second glass layer, the laminate or a combination thereof may have a complexly curved shape and may optionally be cold-formed. As shown in FIG. 5, first glass layer 410 may be complexly-curved and have at least one concave surface (e.g., surface 414) providing a fourth surface of the laminate and at least one convex surface (e.g., surface 412) to provide a third surface of the laminate opposite the first surface with a thickness therebetween. In the cold-forming embodiment, the second glass sheet 430 may be complexly-curved and have at least one concave surface (e.g., second surface 434) and at least one convex surface (e.g., first surface 432) with a thickness therebetween.

In one or more embodiments, one or more of interlayer 420, first glass layer 410, and second glass layer 430 comprise a first edge (e.g., 435) with a first thickness and a second edge (e.g., 437) opposite the first edge with a second thickness greater than the first thickness.

Figure 7:
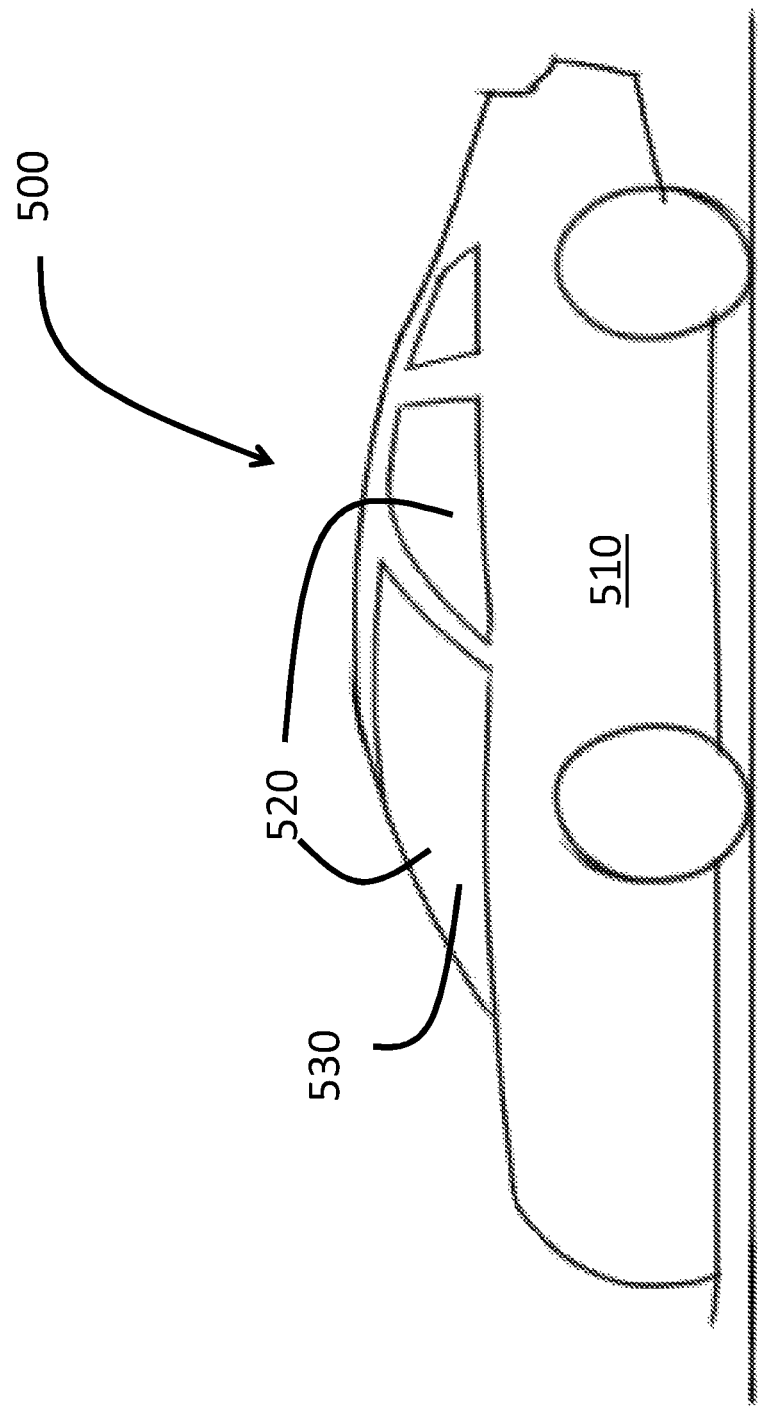
FIG. 7 is an illustration of a vehicle including a glass article or laminate according to one or more embodiments.

A fourth aspect of this disclosure pertains to a vehicle that includes the glass articles or laminates described herein. For example, as shown in FIG. 7 shows a vehicle 500 comprising a body 510 defining an interior, at least one opening 520 in communication with the interior, and a window disposed in the opening, wherein the window comprises a laminate or a glass article 530, according to one or more embodiments described herein. The laminate or glass article 530 may form the sidelights, windshields, rear windows, windows, rear-view mirrors, and sunroofs in the vehicle. In some embodiments, the laminate or glass article 530 may form an interior partition (not shown) within the interior of the vehicle, or may be disposed on an exterior surface of the vehicle and form an engine block cover, headlight cover, taillight cover, or pillar cover. In one or more embodiments, the vehicle may include an interior surface (not shown, but may include door trim, seat backs, door panels, dashboards, center consoles, floor boards, and pillars), and the laminate or glass article described herein is disposed on the interior surface. In one or more embodiment, the interior surface includes a display and the glass layer is disposed over the display. As used herein, vehicle includes automobiles, rolling stock, locomotive, boats, ships, and airplanes, helicopters, drones, space craft and the like.

A fifth aspect of this disclosure pertains to an architectural application that includes the glass articles or laminates described herein. In some embodiments, the architectural application includes balustrades, stairs, decorative panels or covering for walls, columns, partitions, elevator cabs, household appliances, windows, furniture, and other applications, formed at least partially using a laminate or glass article according to one or more embodiments.

In one or more embodiments, the portion of the laminate including the glass article is positioned within a vehicle or architectural application such that the glass article faces the interior of the vehicle or the interior of a building or room, such that the glass article is adjacent to the interior (and the other glass ply is adjacent the exterior). In some embodiments, the glass article of the laminate is in direct contact with the interior (i.e., the surface of the glass article facing the interior is bare and is free of any coatings).

In one or more embodiments, the portion of the laminate including the glass article is positioned within a vehicle or architectural application such that the glass article faces the exterior of the vehicle or the exterior of a building or room, such that the glass article is adjacent to the exterior (and the other glass ply is adjacent the interior). In some embodiments, the glass article of the laminate is in direct contact with the exterior (i.e., the surface of the glass article facing the exterior is bare and is free of any coatings).

In a first example (referring to FIG. 4 or 5), the laminate includes a first glass layer 310, 410 comprising a glass article according to one or more embodiments, a second glass layer 330, 430 comprising a soda lime glass article, and an interlayer 320, 420 comprising PVB. In one or more embodiments, the glass article used in the first layer has a thickness of about 1 mm or less. In some embodiments, the glass article in the first layer is chemically strengthened. In some embodiments, the soda lime glass article used in the second glass layer is annealed. In one or more embodiments, the laminate is positioned in a vehicle such that the first glass layer (comprising the glass article according to one or more embodiments) faces the interior of the vehicle.

In a second example (referring to FIG. 4 or 5), the laminate includes a first glass layer 310, 410 comprising a glass article according to one or more embodiments, a second glass layer 330, 430 comprising a soda lime glass article, and an interlayer 320, 420 comprising PVB. In one or more embodiments, the glass article used in the first layer has a thickness of about 1 mm or less. In some embodiments, the glass article in the first layer is thermally strengthened. In some embodiments, the soda lime glass article used in the second glass layer is annealed. In one or more embodiments, the laminate is positioned in a vehicle such that the first glass layer (comprising the glass article according to one or more embodiments) faces the interior of the vehicle.

A fourth aspect of this disclosure pertains to a method for forming a glass article. In one or more embodiments, the method includes melting a batch composition at a temperature greater than about 1300° C. to form a molten glass, wherein the batch composition comprises an iron source and a glass composition according to one or more of the embodiments described herein; and forming the molten glass into a sheet.

In one or more embodiments, the method the batch composition is melted in an environment comprising an oxygen fugacity of less than about 0.2 (e.g., 0.18 or less, 0.16 or less, 1.5 or less, 1.4 or less, 1.2 or less, or about 0.1 or less). Without being bound by theory, when the batch composition is melted in a more reducing environment, the resulting glass article exhibits improved color and solar performance. In one or more embodiments, the iron source may include any one or more of $Fe_2O_3$, $Fe_3O_4$, and iron oxalate.

In one or more embodiments of the method, melting the batch comprises adding a reducing agent to the batch. The reducing agent may be any material or additive that consumes oxygen when burned or heated. Exemplary reducing agents include carbon, and carbon-containing compounds. As used herein, the phrase "carbon-containing compounds" includes sugar and an organic material such as corn oil, petroleum products (motor oil), potatoes, coconut shells and the like.

EXAMPLES

Various embodiments will be further clarified by the following examples.

Examples 1-47

Examples 1-47 are glass compositions used to form grey tinted glass articles. The glass compositions (in mol %) of Examples 1-47 are provided in Table 1. Table 1 also includes information about the iron source ("$Fe_2O_3$ source"), the reducing agents used (if any), melting environment, and melting temperature (° C.) used to form the glass article. Table 1 also shows the optical performance of the glass articles (at a thickness of 1 mm or 0.7 mm). The a* and b* values are provided in transmittance.

TABLE 1

Examples 1-47.

| | Ex. | | | | |
|---|---|---|---|---|---|
| | 1 | 2 | 3 | 4 | 5 |
| $SiO_2$ | 70 | 70 | 70 | 67 | 67 |
| $Al_2O_3$ | 10 | 10 | 10 | 12.6 | 12.6 |
| $B_2O_3$ | 8.4 | 8.4 | 8.4 | 7.1 | 7.1 |
| $Li_2O$ | 0 | 0 | 0 | 5.1 | 5.1 |
| $Na_2O$ | 9.2 | 9.2 | 9.2 | 6.7 | 6.7 |
| $K_2O$ | 2.2 | 2.2 | 2.2 | 1.3 | 1.3 |
| MgO | 0 | 0 | 0 | 0 | 0 |
| $Fe_2O_3$ | 0.5 | 0.65 | 0.8 | 0.5 | 0.65 |
| $Co_3O_4$ | 0.002 | 0.002 | 0.002 | 0.002 | 0.002 |
| NiO | 0 | 0 | 0 | 0 | 0 |
| $V_2O_5$ | 0 | 0 | 0 | 0 | 0 |
| CuO | | | | | |
| $TiO_2$ | 0 | 0 | 0 | 0 | 0 |
| $SnO_2$ | 0 | 0 | 0 | 0 | 0 |
| $R_2O - Al_2O_3$ | 1.4 | 1.4 | 1.4 | 0.5 | 0.5 |
| $R_2O:Al_2O_3$ | 1.14 | 1.14 | 1.14 | 1.039683 | 1.039683 |
| $R_2O$ | 11.4 | 11.4 | 11.4 | 13.1 | 13.1 |
| $Fe_2O_3$ source | $Fe_2O_3$/I8 | $Fe_2O_3$/I8 | $Fe_2O_3$/I8 | $Fe_2O_3$/I8 | $Fe_2O_3$/I8 |
| reducing agents | none | none | none | none | none |
| melting environment | globar | globar | globar | globar | globar |
| melting temp. (° C.) | 1650 | 1650 | 1650 | 1650 | 1650 |
| total $Fe_2O_3$ wt % | 1.21 | 1.56 | 1.88 | 1.19 | 1.59 |
| $Fe^{2+}$ as FeO | 0.29 | 0.35 | 0.44 | 0.46 | 0.56 |
| $Fe^{2+}$/total Fe | 0.26 | 0.25 | 0.26 | 0.43 | 0.55 |
| thickness (mm) | 1.0 | 1.0 | 1.0 | 1.0 | 1.0 |
| D65 L* | 84.96 | 78.16 | 68.75 | 81.22 | 72.39 |
| D65 a* | 0.23 | 0.91 | 1.96 | 1.25 | 2.22 |
| D65 b* | 1.33 | 2.45 | 3.85 | 3.62 | 5.97 |
| % Tuv (300-380 nm) | | | | | |
| % Tuv (300-400 nm) | | | | | |
| % Tvis (A2) | | | | | |
| % Tts | | | | | |
| Thickness (mm) | 0.7 | 0.7 | 0.7 | 0.7 | 0.7 |
| D65 L* | 88.46 | 81.65 | 73.36 | 84.5 | 76.73 |
| D65 a* | 0.14 | 0.82 | 1.7 | 0.98 | 1.82 |
| D65 b* | 1 | 2 | 3.33 | 2.93 | 5.05 |
| % Tuv (300-380 nm) | 38.8 | 27.2 | 16.9 | 23.5 | 13.4 |
| % Tuv (300-400 nm) | 49.8 | 37.7 | 25.7 | 35.4 | 22.9 |
| % Tvis (A2) | 72.9 | 63.2 | 51.0 | 67.8 | 55.9 |
| % Tts | 80.8 | 75.7 | 69.6 | 77.3 | 71.0 |

| | Ex. | | | | |
|---|---|---|---|---|---|
| | 6 | 7 | 8 | 9 | 10 |
| $SiO_2$ | 67 | 70 | 70 | 67 | 67 |
| $Al_2O_3$ | 12.6 | 10 | 10 | 12.6 | 12.6 |
| $B_2O_3$ | 7.1 | 8.4 | 8.4 | 7.1 | 7.1 |
| $Li_2O$ | 5.1 | 0 | 0 | 5.1 | 5.1 |
| $Na_2O$ | 6.7 | 9.2 | 9.2 | 6.7 | 6.7 |
| $K_2O$ | 1.3 | 2.2 | 2.2 | 1.3 | 1.3 |
| MgO | 0 | 0 | 0 | 0 | 0 |
| $Fe_2O_3$ | 0.8 | 0.5 | 0.8 | 0.5 | 0.5 |
| $Co_3O_4$ | 0.002 | 0.002 | 0.002 | 0.002 | 0.005 |

TABLE 1-continued

Examples 1-47.

|  | | | | | |
|---|---|---|---|---|---|
| NiO | 0 | 0 | 0 | 0 | 0 |
| $V_2O_5$ | 0 | 0 | 0 | 0 | 0 |
| CuO | | | | | |
| $TiO_2$ | 0 | 0 | 0 | 0 | 0 |
| $SnO_2$ | 0 | 0 | 0 | 0 | 0 |
| $R_2O - Al_2O_3$ | 0.5 | 1.4 | 1.4 | 0.5 | 0.5 |
| $R_2O:Al_2O_3$ | 1.039683 | 1.14 | 1.14 | 1.039683 | 1.039683 |
| $R_2O$ | 13.1 | 11.4 | 11.4 | 13.1 | 13.1 |
| $Fe_2O_3$ source | Fe2O3/I8 | Fe2O3/I8 | Fe2O3/I8 | Fe2O3/I8 | Fe2O3/I8 |
| reducing agents | none | none | none | none | none |
| melting environment | globar | gas-oxy | gas-oxy | gas-oxy | gas-oxy |
| melting temp. (° C.) | 1650 | 1650 | 1650 | 1650 | 1650 |
| total $Fe_2O_3$ wt % | 1.9 | 1.12 | 1.75 | 1.12 | 1.14 |
| $Fe^{2+}$ as FeO | 0.67 | 0.34 | 0.51 | 0.47 | 0.48 |
| $Fe^{2+}$/total Fe | 0.42 | 0.33 | 0.32 | 0.47 | 0.47 |
| thickness (mm) | 1.0 | 1.0 | 1.0 | 1.0 | 1.0 |
| D65 L* | 61.87 | 82.51 | 66.29 | 80.85 | 79.36 |
| D65 a* | 3.27 | 0.53 | 2.19 | 1.34 | 1.21 |
| D65 b* | 8.7 | 1.35 | 3.77 | 3.44 | 2.6 |
| % Tuv (300-380 nm) | | | | | |
| % Tuv (300-400 nm) | | | | | |
| % Tvis (A2) | | | | | |
| % Tts | | | | | |
| Thickness (mm) | 0.7 | 0.7 | 0.7 | 0.7 | 0.7 |
| D65 L* | 70.3 | 85.66 | 70.3 | 84.95 | 82.29 |
| D65 a* | 2.5 | 0.46 | 2.1 | 1.02 | 1.02 |
| D65 b* | 7.01 | 1.13 | 3.42 | 2.68 | 2.17 |
| % Tuv (300-380 nm) | 6.5 | | | | |
| % Tuv (300-400 nm) | 13.0 | | | | |
| % Tvis (A2) | 43.3 | 67.1 | 41.7 | 65.9 | 61.0 |
| % Tts | 64.6 | | | | |

|  | Ex. | | | | |
|---|---|---|---|---|---|
|  | 11 | 12 | 13 | 14 | 15 |
| $SiO_2$ | 67 | 67 | 70 | 70 | 70 |
| $Al_2O_3$ | 12.6 | 12.6 | 10 | 10 | 10 |
| $B_2O_3$ | 7.1 | 7.1 | 8.4 | 8.4 | 8.4 |
| $Li_2O$ | 5.1 | 5.1 | 0 | 0 | 0 |
| $Na_2O$ | 6.7 | 6.7 | 9.2 | 9.2 | 9.2 |
| $K_2O$ | 1.3 | 1.3 | 2.2 | 2.2 | 2.2 |
| MgO | 0 | 0 | | | |
| $Fe_2O_3$ | 0.8 | 0.8 | 0.25 | 0.33 | 0.33 |
| $Co_3O_4$ | 0.002 | 0.005 | 0.002 | 0.002 | 0 |
| NiO | 0 | 0 | 0 | 0 | 0 |
| $V_2O_5$ | 0 | 0 | 0 | 0 | 0 |
| CuO | | | 0 | 0 | 0.2 |
| $TiO_2$ | 0 | 0 | 0 | 0 | 0 |
| $SnO_2$ | 0 | 0 | 0 | 0 | 0 |
| $R_2O - Al_2O_3$ | 0.5 | 0.5 | 1.4 | 1.4 | 1.4 |
| $R_2O:Al_2O_3$ | 1.039683 | 1.039683 | 1.14 | 1.14 | 1.14 |
| $R_2O$ | 13.1 | 13.1 | 11.4 | 11.4 | 11.4 |
| $Fe_2O_3$ source | Fe2O3/I8 | Fe2O3/I8 | Fe2O3/I8 | Fe2O3/I8 | Fe2O3/I8 |
| reducing agents | none | none | none | none | none |
| melting environment | gas-oxy | gas-oxy | gas-oxy | gas-oxy | gas-oxy |
| melting temp. (° C.) | 1650 | 1650 | 1650 | 1650 | 1650 |
| total $Fe_2O_3$ wt % | 1.76 | 1.79 | | | |
| $Fe^{2+}$ as FeO | 0.7 | 0.71 | | | |
| $Fe^{2+}$/total Fe | 0.44 | 0.44 | | | |
| thickness (mm) | 1.0 | 1.0 | 1.0 | 1.0 | 1.0 |
| D65 L* | 63.32 | 61.25 | 92.36 | 89.75 | 90.04 |
| D65 a* | 3.17 | 3.1 | −0.48 | −0.25 | −1.35 |
| D65 b* | 8.05 | 7.62 | −0.27 | 0.14 | 11.54 |
| % Tuv (300-380 nm) | | | | | |
| % Tuv (300-400 nm) | | | | | |
| % Tvis (A2) | | | | | |
| % Tts | | | | | |
| Thickness (mm) | 0.7 | 0.7 | 0.7 | 0.7 | 0.7 |
| D65 L* | 67.16 | 67.22 | 93.34 | 91.41 | 91.85 |
| D65 a* | 2.86 | 2.62 | −0.35 | −0.18 | −1.14 |
| D65 b* | 7.2 | 6.61 | −0.2 | 0.11 | 8.75 |
| % Tuv (300-380 nm) | | | | | |
| % Tuv (300-400 nm) | | | | | |
| % Tvis (A2) | 37.8 | 37.9 | | | |
| % Tts | | | | | |

TABLE 1-continued

Examples 1-47.

| | Ex. | | | | |
|---|---|---|---|---|---|
| | 16 | 17 | 18 | 19 | 20 |
| SiO$_2$ | 67 | 67 | 67 | 67 | 67 |
| Al$_2$O$_3$ | 12.6 | 12.6 | 12.6 | 12.6 | 12.6 |
| B$_2$O$_3$ | 7.1 | 7.1 | 7.1 | 7.1 | 7.1 |
| Li$_2$O | 5.1 | 5.1 | 5.1 | 5.1 | 5.1 |
| Na$_2$O | 6.7 | 6.7 | 6.7 | 6.7 | 6.7 |
| K$_2$O | 1.3 | 1.3 | 1.3 | 1.3 | 1.3 |
| MgO | | | | | |
| Fe$_2$O$_3$ | 0.2 | 0.3 | 0.3 | 0.25 | 0.25 |
| Co$_3$O$_4$ | 0.002 | 0.002 | 0 | 0.002 | 0.002 |
| NiO | 0 | 0 | 0 | 0 | 0 |
| V$_2$O$_5$ | 0 | 0 | 0 | 0 | 0 |
| CuO | 0 | 0 | 0.2 | | |
| TiO$_2$ | 0 | 0 | 0 | 0 | 0 |
| SnO$_2$ | 0 | 0 | 0 | 0 | 0 |
| R$_2$O − Al$_2$O$_3$ | 0.5 | 0.5 | 0.5 | 0.5 | 0.5 |
| R$_2$O:Al$_2$O$_3$ | | | | | |
| R$_2$O | 13.1 | 13.1 | 13.1 | 13.1 | 13.1 |
| Fe$_2$O$_3$ source | Fe2O3/I8 | Fe2O3/I8 | Fe2O3/I8 | Fe2O3/I8 | Fe3O4/I27 |
| reducing agents | none | none | none | none | none |
| melting environment | gas-oxy | gas-oxy | gas-oxy | gas-oxy | gas-oxy |
| melting temp. (° C.) | 1650 | 1650 | 1650 | 1650 | 1650 |
| total Fe$_2$O$_3$ wt % | | | | 0.52 | 0.61 |
| Fe$^{2+}$ as FeO | | | | 0.28 | 0.31 |
| Fe$^{2+}$/total Fe | | | | 0.59 | 0.57 |
| thickness (mm) | 1.0 | 1.0 | 1.0 | 1.0 | 1.0 |
| D65 L* | 92.74 | 89.32 | 89.43 | 91.79 | 90.26 |
| D65 a* | −0.03 | 0.34 | −0.89 | 0.11 | 0.24 |
| D65 b* | −0.02 | 1.02 | 10.2 | 0.33 | 0.69 |
| % Tuv (300-380 nm) | | | | | |
| % Tuv (300-400 nm) | | | | | |
| % Tvis (A2) | | | | | |
| % Tts | | | | | |
| Thickness (mm) | 0.7 | 0.7 | 0.7 | 0.7 | 0.7 |
| D65 L* | 93.89 | 91.11 | 91.51 | 93.25 | 92.09 |
| D65 a* | 0 | 0.27 | −0.7 | 0.09 | 0.22 |
| D65 b* | 0.1 | 0.86 | 7.32 | 0.33 | 0.7 |
| % Tuv (300-380 nm) | | | | 49.0 | 44.1 |
| % Tuv (300-400 nm) | | | | 61.1 | 56.6 |
| % Tvis (A2) | | | | 83.2 | 81.0 |
| % Tts | | | | 85.7 | 84.4 |

| | Ex. | | | | |
|---|---|---|---|---|---|
| | 21 | 22 | 23 | 24 | 25 |
| SiO$_2$ | 67 | 67 | 67 | 67 | 67 |
| Al$_2$O$_3$ | 12.6 | 12.6 | 12.6 | 12.6 | 12.6 |
| B$_2$O$_3$ | 7.1 | 7.1 | 7.1 | 7.1 | 7.1 |
| Li$_2$O | 5.1 | 5.1 | 5.1 | 5.1 | 5.1 |
| Na$_2$O | 6.7 | 6.7 | 6.7 | 6.7 | 6.7 |
| K$_2$O | 1.3 | 1.3 | 1.3 | 1.3 | 1.3 |
| MgO | | | | | 0.5 |
| Fe$_2$O$_3$ | 0.25 | 0.25 | 0.25 | 0.25 | 0.5 |
| Co$_3$O$_4$ | 0.002 | 0 | 0 | 0 | 0.002 |
| NiO | 0 | 0.1 | 0.1 | 0.1 | 0 |
| V$_2$O$_5$ | 0 | 0 | 0 | 0 | 0 |
| CuO | | | | | |
| TiO$_2$ | 0 | 0 | 0 | 0 | 0 |
| SnO$_2$ | 0 | 0 | 0 | 0 | 0 |
| R$_2$O − Al$_2$O$_3$ | 0.5 | 0.5 | 0.5 | 0.5 | 0.5 |
| R$_2$O:Al$_2$O$_3$ | | | | | |
| R$_2$O | 13.1 | 13.1 | 13.1 | 13.1 | 13.1 |
| Fe$_2$O$_3$ source | oxalate/I2 | Fe2O3/I8 | Fe3O4/I27 | oxalate/I2 | Fe2O3/I8 |
| reducing agents | none | none | none | none | none |
| melting environment | gas-oxy | gas-oxy | gas-oxy | gas-oxy | gas-oxy |
| melting temp. (° C.) | 1650 | 1650 | 1650 | 1650 | 1650 |
| total Fe$_2$O$_3$ wt % | 0.61 | 0.54 | 0.61 | 0.61 | 1.09 |
| Fe$^{2+}$ as FeO | 0.52 | 0.28 | 0.31 | 0.57 | 0.5 |
| Fe$^{2+}$/total Fe | 0.94 | 0.57 | 0.57 | 1 | 0.51 |
| thickness (mm) | 1.0 | 1.0 | 1.0 | 1.0 | 1.0 |
| D65 L* | 91.38 | 88.74 | 87.57 | 81.62 | 78.41 |
| D65 a* | −0.32 | 0.95 | 1.08 | 1.03 | 1.34 |

TABLE 1-continued

Examples 1-47.

| | | | | | |
|---|---|---|---|---|---|
| D65 b* | −0.4 | 10.19 | 10.88 | 3.33 | 4.28 |
| % Tuv (300-380 nm) | | | | | 15.2 |
| % Tuv (300-400 nm) | | | | | 25.5 |
| % Tvis (A2) | | | | | 58.3 |
| % Tts | | | | | 70.6 |
| Thickness (mm) | 0.7 | 0.7 | 0.7 | 0.7 | 0.7 |
| D65 L* | 92.81 | 90.96 | 89.81 | 91.38 | |
| D65 a* | −0.16 | 0.58 | 0.73 | 0.31 | |
| D65 b* | −0.22 | 7.5 | 8.2 | 7.51 | |
| % Tuv (300-380 nm) | 62.8 | 43.9 | 36.1 | 62.5 | |
| % Tuv (300-400 nm) | 70.6 | 55.5 | 48.5 | 68.3 | |
| % Tvis (A2) | 82.4 | 79.2 | 77.1 | 79.5 | |
| % Tts | 82.6 | 82.2 | 80.9 | 79.3 | |

| | Ex. | | | | |
|---|---|---|---|---|---|
| | 26 | 27 | 28 | 29 | 30 |
| $SiO_2$ | 67 | 67 | 67 | 67 | 67 |
| $Al_2O_3$ | 12.6 | 12.6 | 12.6 | 12.6 | 12.6 |
| $B_2O_3$ | 7.1 | 7.1 | 7.1 | 7.1 | 7.1 |
| $Li_2O$ | 5.1 | 5.1 | 5.1 | 5.1 | 5.1 |
| $Na_2O$ | 6.7 | 6.7 | 4.7 | 6.7 | 6.7 |
| $K_2O$ | 1.3 | 1.3 | 1.3 | 1.3 | 1.3 |
| MgO | 0.5 | 0.8 | 0.8 | 0.8 | 0 |
| $Fe_2O_3$ | 0.5 | 0.5 | 0.5 | 0.5 | 0.25 |
| $Co_3O_4$ | 0.002 | 0.002 | 0.002 | 0.002 | 0 |
| NiO | 0 | 0 | 0 | 0 | 0 |
| $V_2O_5$ | 0 | 0 | 0 | 0 | 0 |
| CuO | | | | | |
| $TiO_2$ | 0 | 0 | 0 | 0 | 0 |
| $SnO_2$ | 0 | 0 | 0 | 0 | 0.1 |
| $R_2O - Al_2O_3$ | 0.5 | 0.5 | −1.5 | 0.5 | 0.5 |
| $R_2O:Al_2O_3$ | | | | | |
| $R_2O$ | 13.1 | 13.1 | 11.1 | 13.1 | 13.1 |
| $Fe_2O_3$ source | Fe3O4/I27 | oxalate/I2 | Fe2O3/I8 | Fe2O3/I8 | oxalate/I2 |
| reducing agents | none | none | sulphate | sugar | none |
| melting environment | gas-oxy | gas-oxy | gas-oxy | gas-oxy | gas-oxy |
| melting temp. (° C.) | 1650 | 1650 | 1650 | 1650 | 1650 |
| total $Fe_2O_3$ wt % | 1.21 | 1.17 | 1.06 | | 0.62 |
| $Fe^{2+}$ as FeO | 0.56 | 0.98 | 0.55 | | 0.59 |
| $Fe^{2+}$/total Fe | 0.51 | 0.93 | 0.57 | | 1 |
| thickness (mm) | 1.0 | 1.0 | 1.0 | 1.0 | |
| D65 L* | 84.55 | 82.25 | 86.34 | | |
| D65 a* | 0 | 0.79 | −0.36 | | |
| D65 b* | 0.82 | 3.03 | 3.29 | | |
| % Tuv (300-380 nm) | 15.2 | 30.7 | 16.4 | 19.8 | |
| % Tuv (300-400 nm) | 25.4 | 41.0 | 27.0 | 24.7 | |
| % Tvis (A2) | 58.2 | 63.8 | 59.9 | 50.1 | |
| % Tts | 70.3 | 67.0 | 70.7 | 58.6 | |
| Thickness (mm) | | | | | 0.7 |
| D65 L* | | | | | 93.8 |
| D65 a* | | | | | −0.05 |
| D65 b* | | | | | 0.84 |
| % Tuv (300-380 nm) | | | | | 60.9 |
| % Tuv (300-400 nm) | | | | | 69.2 |
| % Tvis (A2) | | | | | 84.7 |
| % Tts | | | | | 83.0 |

| | Ex. | | | | |
|---|---|---|---|---|---|
| | 31 | 32 | 33 | 34 | 35 |
| $SiO_2$ | 67 | 67 | 67 | 67 | 67 |
| $Al_2O_3$ | 12.6 | 12.6 | 12.6 | 12.6 | 12.6 |
| $B_2O_3$ | 7.1 | 7.1 | 7.1 | 7.1 | 7.1 |
| $Li_2O$ | 5.1 | 5.1 | 5.1 | 5.1 | 5.1 |
| $Na_2O$ | 6.7 | 6.7 | 6.7 | 6.7 | 6.7 |
| $K_2O$ | 1.3 | 1.3 | 1.3 | 1.3 | 1.3 |
| MgO | 0 | 0 | 0 | 0 | 0 |
| $Fe_2O_3$ | 0.5 | 0.8 | 1 | 0.25 | 0.25 |
| $Co_3O_4$ | 0 | 0 | 0 | 0.001 | 0.002 |
| NiO | 0 | 0 | 0 | 0 | 0 |
| $V_2O_5$ | 0 | 0 | 0 | 0 | 0 |
| CuO | | | | | |
| $TiO_2$ | 0 | 0 | 0 | 0 | 0 |
| $SnO_2$ | 0.1 | 0.1 | 0.1 | 0.1 | 0.1 |

TABLE 1-continued

Examples 1-47.

| | 31 | 32 | 33 | 34 | 35 |
|---|---|---|---|---|---|
| $R_2O - Al_2O_3$ | 0.5 | 0.5 | 0.5 | 0.5 | 0.5 |
| $R_2O:Al_2O_3$ | | | | | |
| $R_2O$ | 13.1 | 13.1 | 13.1 | 13.1 | 13.1 |
| $Fe_2O_3$ source | oxalate/I2 | oxalate/I2 | oxalate/I2 | oxalate/I2 | oxalate/I2 |
| reducing agents | none | none | none | none | none |
| melting environment | gas-oxy | gas-oxy | gas-oxy | gas-oxy | gas-oxy |
| melting temp. (° C.) | 1650 | 1650 | 1650 | 1650 | 1650 |
| total $Fe_2O_3$ wt % | 1.22 | 1.9 | 2.38 | 0.63 | 0.64 |
| $Fe^{2+}$ as FeO | 1.08 | 1.65 | 2.05 | 0.6 | 0.6 |
| $Fe^{2+}$/total Fe | 0.99 | 0.97 | 0.96 | 1 | 1 |
| thickness (mm) | | | | | |
| D65 L* | | | | | |
| D65 a* | | | | | |
| D65 b* | | | | | |
| % Tuv (300-380 nm) | | | | | |
| % Tuv (300-400 nm) | | | | | |
| % Tvis (A2) | | | | | |
| % Tts | | | | | |
| Thickness (mm) | 0.7 | 0.7 | 0.7 | 0.7 | 0.7 |
| D65 L* | 88.02 | 77.83 | 71.12 | 94.03 | 93.37 |
| D65 a* | 0.35 | 1.04 | 1.29 | −0.09 | −0.11 |
| D65 b* | 1.92 | 3.56 | 4.53 | 0.73 | −0.07 |
| % Tuv (300-380 nm) | 39.6 | 19.2 | 11.7 | 62.6 | 61.2 |
| % Tuv (300-400 nm) | 49.5 | 27.6 | 18.5 | 70.6 | 69.7 |
| % Tvis (A2) | 72.5 | 53.2 | 42.6 | 85.2 | 83.4 |
| % Tts | 73.2 | 60.2 | 53.3 | 83.5 | 83.3 |

| | Ex. | | | | |
|---|---|---|---|---|---|
| | 36 | 37 | 38 | 39 | 40 |
| $SiO_2$ | 67 | 67 | 67 | 67 | 67 |
| $Al_2O_3$ | 12.6 | 12.6 | 12.6 | 12.6 | 12.6 |
| $B_2O_3$ | 7.1 | 7.1 | 7.1 | 7.1 | 7.1 |
| $Li_2O$ | 5.1 | 5.1 | 5.1 | 5.1 | 5.1 |
| $Na_2O$ | 6.7 | 6.7 | 6.7 | 6.7 | 6.7 |
| $K_2O$ | 1.3 | 1.3 | 1.3 | 1.3 | 1.3 |
| MgO | 0 | 0 | 0 | 0 | 0 |
| $Fe_2O_3$ | 0.5 | 0.5 | 1 | 0 | 0 |
| $Co_3O_4$ | 0.001 | 0.002 | 0.001 | 0 | 0 |
| NiO | 0 | 0 | 0 | 0 | 0 |
| $V_2O_5$ | 0 | 0 | 0 | 0.01 | 0.02 |
| CuO | | | | | |
| $TiO_2$ | 0 | 0 | 0 | 0 | 0 |
| $SnO_2$ | 0.1 | 0.1 | 0.1 | 0.1 | 0.1 |
| $R_2O - Al_2O_3$ | 0.5 | 0.5 | 0.5 | 0.5 | 0.5 |
| $R_2O:Al_2O_3$ | | | | | |
| $R_2O$ | 13.1 | 13.1 | 13.1 | 13.1 | 13.1 |
| $Fe_2O_3$ source | oxalate/I2 | oxalate/I2 | oxalate/I2 | oxalate/I2 | oxalate/I2 |
| reducing agents | none | none | none | none | none |
| melting environment | gas-oxy | gas-oxy | gas-oxy | gas-oxy | gas-oxy |
| melting temp. (° C.) | 1650 | 1650 | 1650 | 1650 | 1650 |
| total $Fe_2O_3$ wt % | 1.2 | 1.19 | 2.31 | | |
| $Fe^{2+}$ as FeO | 1.07 | 1.07 | 1.97 | | |
| $Fe^{2+}$/total Fe | 0.99 | 1 | 0.95 | | |
| thickness (mm) | | | | | |
| D65 L* | | | | | |
| D65 a* | | | | | |
| D65 b* | | | | | |
| % Tuv (300-380 nm) | | | | | |
| % Tuv (300-400 nm) | | | | | |
| % Tvis (A2) | | | | | |
| % Tts | | | | | |
| Thickness (mm) | 0.7 | 0.7 | 0.7 | 0.7 | 0.7 |
| D65 L* | 88.25 | 87.34 | 72.1 | 96.4 | 96.43 |
| D65 a* | 0.35 | 0.22 | 1.31 | −0.09 | −0.26 |
| D65 b* | 1.89 | 0.85 | 4.53 | 0.22 | 0.34 |
| % Tuv (300-380 nm) | 40.1 | 40.0 | 12.7 | 77.1 | 74.7 |
| % Tuv (300-400 nm) | 50.1 | 49.9 | 19.6 | 82.2 | 80.7 |
| % Tvis (A2) | 73.0 | 70.7 | 44.4 | 90.6 | 90.9 |
| % Tts | 73.6 | 73.0 | 54.5 | 90.8 | 90.9 |

TABLE 1-continued

Examples 1-47.

|  | Ex. 41 | Ex. 42 | Ex. 43 | Ex. 44 | Ex. 45 |
|---|---|---|---|---|---|
| $SiO_2$ | 67 | 67 | 67 | 67 | 67 |
| $Al_2O_3$ | 12.6 | 12.6 | 12.6 | 12.6 | 12.6 |
| $B_2O_3$ | 7.1 | 7.1 | 7.1 | 7.1 | 7.1 |
| $Li_2O$ | 5.1 | 5.1 | 5.1 | 5.1 | 5.1 |
| $Na_2O$ | 6.7 | 6.7 | 6.7 | 6.7 | 6.7 |
| $K_2O$ | 1.3 | 1.3 | 1.3 | 1.3 | 1.3 |
| MgO | 0 | 0 | 0 | 0 | 0 |
| $Fe_2O_3$ | 0 | 0.5 | 0.25 | 0 | 0 |
| $Co_3O_4$ | 0 | 0 | 0 | 0 | 0 |
| NiO | 0 | 0 | 0 | 0.05 | 0.1 |
| $V_2O_5$ | 0.05 | 0.02 | 0.02 | 0 | 0 |
| CuO |  |  |  |  |  |
| $TiO_2$ | 0 | 0 | 0 | 0 | 0 |
| $SnO_2$ | 0.1 | 0.1 | 0.1 | 0.1 | 0.1 |
| $R_2O - Al_2O_3$ | 0.5 | 0.5 | 0.5 | 0.5 | 0.5 |
| $R_2O:Al_2O_3$ |  |  |  |  |  |
| $R_2O$ | 13.1 | 13.1 | 13.1 | 13.1 | 13.1 |
| $Fe_2O_3$ source | oxalate/I2 | oxalate/I2 | oxalate/I2 | oxalate/I2 | oxalate/I2 |
| reducing agents | none | none | none | none | none |
| melting environment | gas-oxy | gas-oxy | gas-oxy | gas-oxy | gas-oxy |
| melting temp. (° C.) | 1650 | 1650 | 1650 | 1650 | 1650 |
| total $Fe_2O_3$ wt % |  | 1.20 | 0.62 |  |  |
| $Fe^{2+}$ as FeO |  | 1.13 | 0.66 |  |  |
| $Fe^{2+}$/total Fe |  | 1.00 | 1.00 |  |  |
| thickness (mm) |  |  |  |  |  |
| D65 L* |  |  |  |  |  |
| D65 a* |  |  |  |  |  |
| D65 b* |  |  |  |  |  |
| % Tuv (300-380 nm) |  |  |  |  |  |
| % Tuv (300-400 nm) |  |  |  |  |  |
| % Tvis (A2) |  |  |  |  |  |
| % Tts |  |  |  |  |  |
| Thickness (mm) | 0.7 | 0.7 | 0.7 | 0.7 | 0.7 |
| D65 L* | 95.85 | 87.31 | 92.99 | 95.27 | 93.9 |
| D65 a* | −0.64 | 0.38 | −0.1 | 0.3 | 0.56 |
| D65 b* | 0.68 | 3.52 | 1.82 | 3.19 | 5.96 |
| % Tuv (300-380 nm) | 57.4 | 34.0 | 51.2 | 88.9 | 88.0 |
| % Tuv (300-400 nm) | 68.8 | 44.2 | 61.4 | 89.4 | 88.2 |
| % Tvis (A2) | 89.3 | 71.2 | 83.1 | 88.8 | 86.1 |
| % Tts | 89.4 | 73.2 | 82.6 | 90.0 | 88.2 |

|  | Ex. 46 | Ex. 47 |
|---|---|---|
| $SiO_2$ | 67 | 67 |
| $Al_2O_3$ | 12.6 | 12.6 |
| $B_2O_3$ | 7.1 | 7.1 |
| $Li_2O$ | 5.1 | 5.1 |
| $Na_2O$ | 6.7 | 6.7 |
| $K_2O$ | 1.3 | 1.3 |
| MgO | 0 | 0 |
| $Fe_2O_3$ | 0.5 | 0.5 |
| $Co_3O_4$ | 0.002 | 0.002 |
| NiO | 0 | 0 |
| $V_2O_5$ | 0.02 | 0.05 |
| CuO |  |  |
| $TiO_2$ | 0 | 0 |
| $SnO_2$ | 0.1 | 0.1 |
| $R_2O - Al_2O_3$ | 0.5 | 0.5 |
| $R_2O:Al_2O_3$ |  |  |
| $R_2O$ | 13.1 | 13.1 |
| $Fe_2O_3$ source | oxalate/I2 | oxalate/I2 |
| reducing agents | none | none |
| melting environment | gas-oxy | gas-oxy |
| melting temp. (° C.) | 1650 | 1650 |
| total $Fe_2O_3$ wt % | 1.22 | 1.22 |
| $Fe^{2+}$ as FeO | 1.15 | 1.17 |
| $Fe^{2+}$/total Fe | 1.00 | 1.00 |
| thickness (mm) |  |  |
| D65 L* |  |  |
| D65 a* |  |  |

TABLE 1-continued

| Examples 1-47. | | |
|---|---|---|
| D65 b* | | |
| % Tuv (300-380 nm) | | |
| % Tuv (300-400 nm) | | |
| % Tvis (A2) | | |
| % Tts | | |
| Thickness (mm) | 0.7 | 0.7 |
| D65 L* | 86.01 | 82.87 |
| D65 a* | 0.23 | 0.47 |
| D65 b* | 2.55 | 5.13 |
| % Tuv (300-380 nm) | 32.7 | 22.9 |
| % Tuv (300-400 nm) | 42.8 | 32.6 |
| % Tvis (A2) | 68.4 | 62.6 |
| % Tts | 71.5 | 68.9 |

Figure 8:
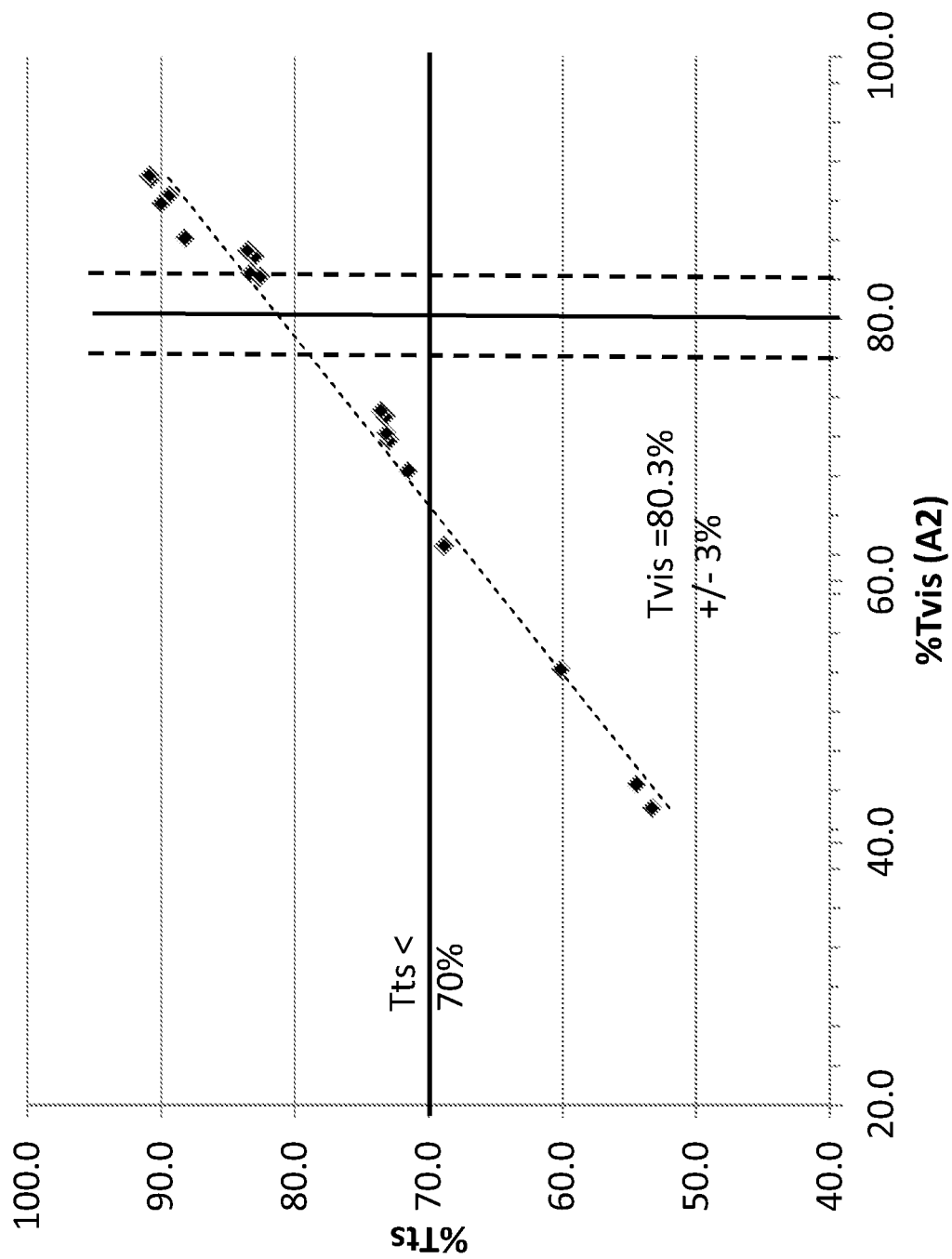
FIG. 8 is a graph showing the average total solar transmittance (% Tts) and transmittance along the visible spectrum (% Tvis) of Examples 30-47.

FIG. 8 is a graph showing the average total solar transmittance (% Tts) and transmittance along the visible spectrum (% Tvis) of Examples 30-47.

Figure 9:
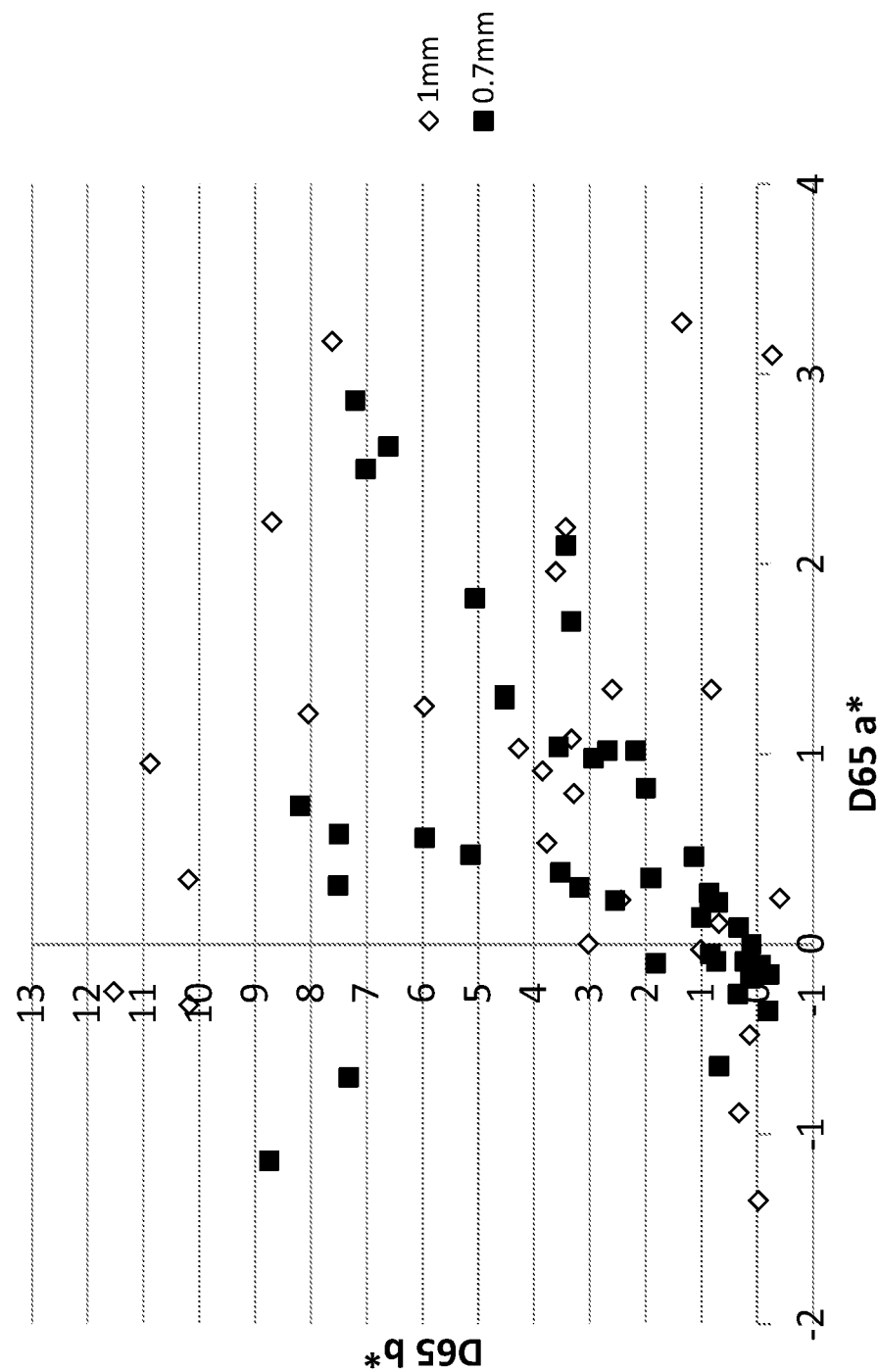
FIG. 9 is a graph showing the a* and b* values (as measured using a D65 illuminant) for Examples 1-47.

FIG. 9 is a graph showing the a* and b* values (as measured using a D65 illuminant) for Examples 1-47, for a 1 mm thickness and a 0.7 mm thickness.

Figure 10:
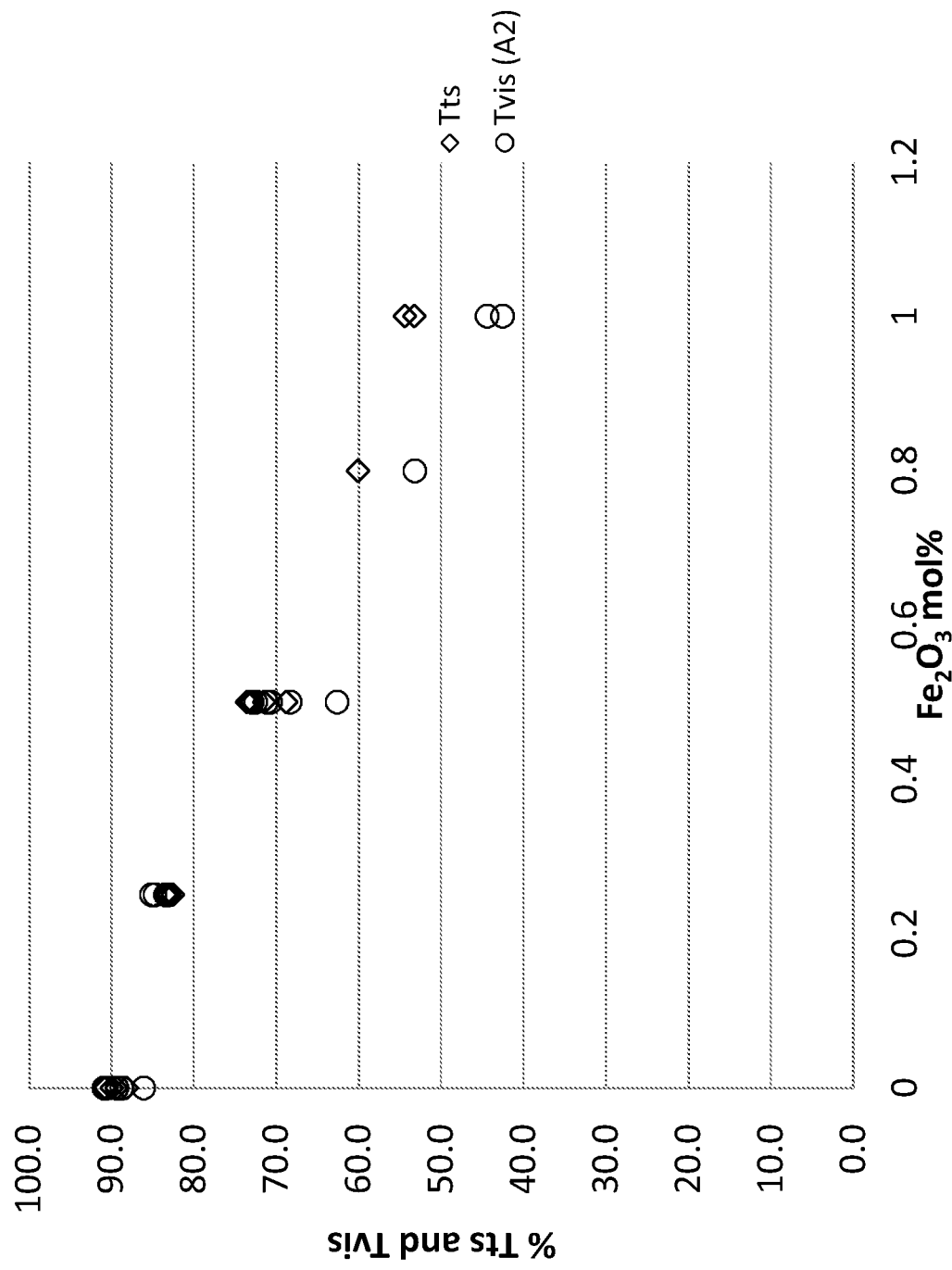
FIG. 10 is a graph showing the average total solar transmittance (% Tts) and average transmittance along the visible spectrum (% Tvis), as a function of $Fe_2O_3$ amount (mol %) for Examples 30-47.

FIG. 10 is a graph showing the average total solar transmittance (% Tts) and average transmittance along the visible spectrum (% Tvis), as a function of $Fe_2O_3$ amount (mol %) for Examples 30-47.

Figure 11:
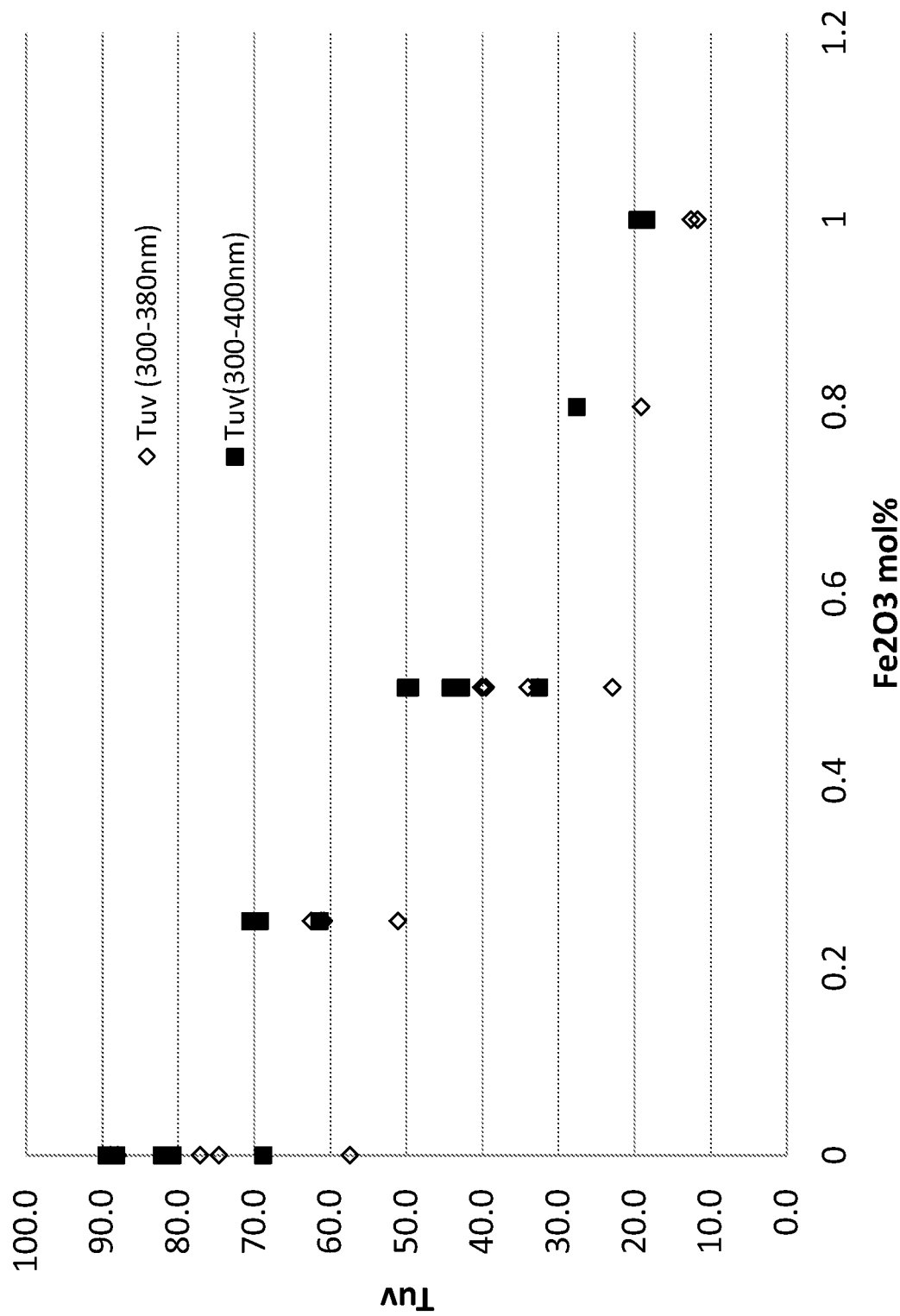
FIG. 11 is a graph showing the average transmittance along the UV spectrum (% Tuv) as a function of $Fe_2O_3$ amount (mol %) for Examples 30-47.

FIG. 11 is a graph showing the average transmittance along the UV spectrum (% Tuv) as a function of $Fe_2O_3$ amount (mol %) for Examples 30-47.

Figure 12:
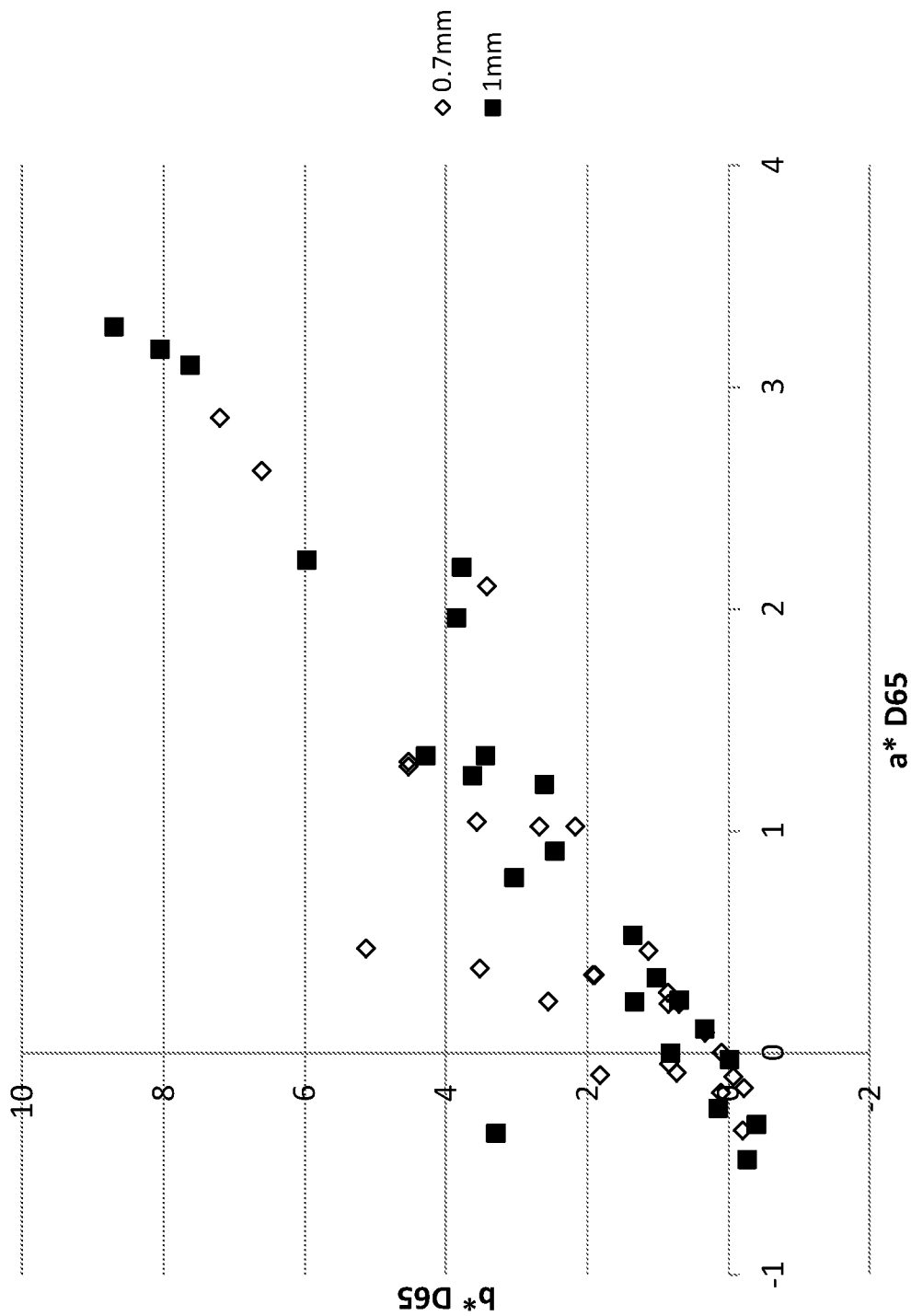
FIG. 12 is a graph showing the a* and b* values (as measured using a D65 illuminant) for Examples 1-37 and Examples 7-47.
Figure 13:
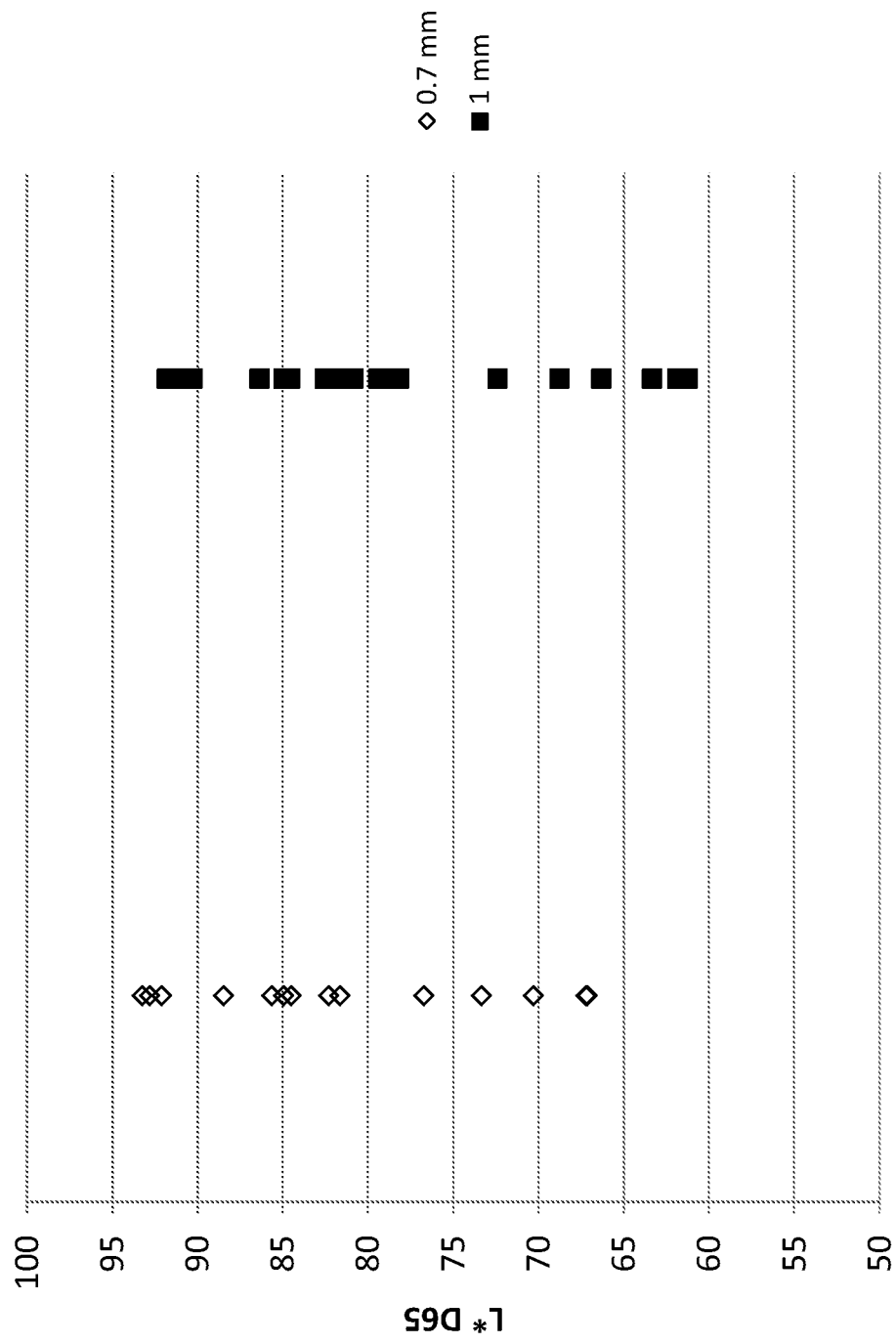
FIG. 13 is a graph showing the corresponding L* value (as measured using a D65 illuminant) for Examples 1-37.

FIG. 12 is a graph showing the a* and b* values (as measured using a D65 illuminant) for Examples 1-37, for a 1 mm thickness, and for Examples 7-47, for a 0.7 mm thickness. FIG. 13 is a graph showing the corresponding L* value (as measured using a D65 illuminant) for Examples 1-37, for a 1 mm thickness and a 0.7 mm thickness. These glasses exhibited a grey-brown tint.

Example 48-85

Examples 48-85 are glass compositions used to form green tinted glass articles. The glass compositions (in mol %) of Examples 48-85 are provided in Table 2. Table 2 also includes information about the iron source ("$Fe_2O_3$ source"), the reducing agents used (if any), melting environment, and melting temperature (° C.) used to form the glass article. Table 2 also shows the optical performance of the glass articles (at a thickness of 1 mm or 0.7 mm). The a* and b* values are provided in transmittance.

TABLE 2

| | Examples 48-85. | | | | |
|---|---|---|---|---|---|
| | Ex. | | | | |
| | 48 | 49 | 50 | 51 | 52 |
| $SiO_2$ | 69.17 | 69.17 | 69.17 | 69.2 | 69.2 |
| $Al_2O_3$ | 8.53 | 8.53 | 8.53 | 8.5 | 8.5 |
| $Na_2O$ | 13.94 | 13.94 | 13.94 | 13.9 | 13.9 |
| $K_2O$ | 1.17 | 1.17 | 1.17 | 1.2 | 1.2 |
| MgO | 6.45 | 6.45 | 6.45 | 6.5 | 6.5 |
| CaO | 0.54 | 0.54 | 0.54 | 0 | 0 |
| $Fe_2O_3$ | 0.05 | 0.13 | 0.25 | 0.5 | 0.6 |
| $Co_3O_4$ | 0 | 0 | 0 | 0 | 0 |
| NiO | 0 | 0 | 0 | 0 | 0 |
| $V_2O_5$ | 0 | 0 | 0 | 0 | 0 |
| $TiO_2$ | 0 | 0 | 0 | 0 | 0 |
| $SnO_2$ | 0.19 | 0.19 | 0.19 | 0.2 | 0.2 |
| $R_2O - Al_2O_3$ | 6.58 | 6.58 | 6.58 | 6.6 | 6.6 |
| $R_2O:Al_2O_3$ | 1.771395 | 1.771395 | 1.771395 | 1.776471 | 1.776471 |
| $R_2O$ | 15.11 | 15.11 | 15.11 | 15.1 | 15.1 |
| $Fe_2O_3$ source | Fe2O3/I8 | Fe2O3/I8 | Fe2O3/I8 | Fe2O3/I8 | Fe2O3/I8 |
| reducing agents added | none | none | none | none | none |
| melting furnace environment | globar | globar | globar | globar | globar |
| melting temp (° C.) | 1600 | 1600 | 1600 | 1650 | 1650 |
| total $Fe_2O_3$ wt % | 0.13 | 0.33 | 0.63 | 1.3 | 1.5 |
| Fe2+ as FeO | | | | | |
| Fe2+/total Fe | | | | | |
| thickness mm | 1.0 | 1.0 | 1.0 | 1.0 | 1.0 |
| D65 L* | | | | 93.0 | 91.6 |
| D65 a* | | | | -2.71 | -3.19 |
| D65 b* | | | | 2.01 | 2.93 |
| Tuv (300-380 nm) | | | | | |
| Tuv (300-400 nm) | | | | | |
| Tvis (A2) | | | | | |
| Tts (%) | | | | | |
| Thickness (mm) | 0.7 | 0.7 | 0.7 | 0.7 | 0.7 |
| D65 L* | 96.5 | 96.1 | 95.8 | 94.0 | 93.1 |

TABLE 2-continued

| Examples 48-85. | | | | | |
|---|---|---|---|---|---|
| D65 a* | −0.319 | −0.684 | −0.91 | −1.885 | −2.19 |
| D65 b* | 0.007 | −0.059 | 0.472 | 1.448 | 2.175 |
| Tuv (300-380 nm) | | | | | |
| Tuv (300-400 nm) | 87.4 | 81.1 | 72.1 | 57.2 | 50.4 |
| Tvis (A2) | 91.0 | 90.0 | 89.3 | 84.9 | 82.9 |
| Tts (%) | 89.9 | 87.9 | 86.7 | 80.1 | 77.9 |
| Thickness (mm) | | | | | |
| D65 L* | | | | | |
| D65 a* | | | | | |
| D65 b* | | | | | |
| Tuv (300-380 nm) | | | | | |
| Tuv (300-400 nm) | | | | | |
| Tvis (A2) | | | | | |
| Tts (%) | | | | | |

| | Ex. | | | | |
|---|---|---|---|---|---|
| | 53 | 54 | 55 | 56 | 57 |
| SiO$_2$ | 69.2 | 69.2 | 69.17 | 69.17 | 69.17 |
| Al$_2$O$_3$ | 8.5 | 8.5 | 8.53 | 8.53 | 8.53 |
| Na$_2$O | 13.9 | 13.9 | 13.94 | 13.94 | 13.94 |
| K$_2$O | 1.2 | 1.2 | 1.17 | 1.17 | 1.17 |
| MgO | 6.5 | 6.5 | 6.45 | 6.45 | 6.45 |
| CaO | 0 | 0 | 0.54 | 0.54 | 0.54 |
| Fe$_2$O$_3$ | 0.8 | 1 | 0.54 | 0.54 | 0.68 |
| Co$_3$O$_4$ | 0 | 0 | 0 | 0.002 | 0 |
| NiO | 0 | 0 | 0 | 0 | 0 |
| V$_2$O$_5$ | 0 | 0 | 0 | 0 | 0 |
| TiO$_2$ | 0 | 0 | 0 | 0 | 0 |
| SnO$_2$ | 0 | 0 | 0.19 | 0.19 | 0.19 |
| R$_2$O − Al$_2$O$_3$ | 6.6 | 6.6 | 6.58 | 6.58 | 6.58 |
| R$_2$O:Al$_2$O$_3$ | 1.776471 | 1.776471 | 1.771395 | 1.771395 | 1.771395 |
| R$_2$O | 15.1 | 15.1 | 15.11 | 15.11 | 15.11 |
| Fe$_2$O$_3$ source | Fe2O3/I8 | Fe2O3/I8 | Fe2O3/I8 | Fe2O3/I8 | Fe2O3/I8 |
| reducing agents added | none | none | none | none | none |
| melting furnace environment | globar | globar | globar | globar | globar |
| melting temp (° C.) | 1650 | 1650 | 1600 | 1600 | 1600 |
| total Fe$_2$O$_3$ wt % | 2 | 2.5 | 1.35 | 1.35 | 1.52 |
| Fe2+ as FeO | | | | | 0.36 |
| Fe2+/total Fe | | | | | 0.26 |
| thickness mm | 1.0 | 1.0 | 1.0 | 1.0 | 1.0 |
| D65 L* | 89.2 | 85.5 | 93.7 | 91.2 | 91.8 |
| D65 a* | −3.74 | −4.02 | −2.34 | −3.13 | −3.12 |
| D65 b* | 5.28 | 8.15 | 2.95 | −0.33 | 4.09 |
| Tuv (300-380 nm) | | | | | |
| Tuv (300-400 nm) | | | | | |
| Tvis (A2) | | | | | |
| Tts (%) | | | | | |
| Thickness (mm) | 0.7 | 0.7 | 0.7 | 0.7 | 0.7 |
| D65 L* | 91.3 | 88.5 | 94.9 | 93.3 | 93.7 |
| D65 a* | −2.578 | −2.86 | −1.56 | −2 | −1.95 |
| D65 b* | 3.893 | 6.08 | 2.02 | −0.17 | 2.67 |
| Tuv (300-380 nm) | | | | | |
| Tuv (300-400 nm) | 39.1 | 28.5 | | | |
| Tvis (A2) | 79.1 | 73.4 | | | 84.4 |
| Tts (%) | 74.7 | 70.4 | | | 79.0 |
| Thickness (mm) | | | | | |
| D65 L* | | | | | |
| D65 a* | | | | | |
| D65 b* | | | | | |
| Tuv (300-380 nm) | | | | | |
| Tuv (300-400 nm) | | | | | |
| Tvis (A2) | | | | | |
| Tts (%) | | | | | |

| | Ex. | | | | |
|---|---|---|---|---|---|
| | 58 | 59 | 60 | 61 | 62 |
| SiO$_2$ | 69.17 | 69.17 | 69.17 | 69.17 | 69.17 |
| Al$_2$O$_3$ | 8.53 | 8.53 | 8.53 | 8.53 | 8.53 |
| Na$_2$O | 13.94 | 13.94 | 13.94 | 13.94 | 13.94 |
| K$_2$O | 1.17 | 1.17 | 1.17 | 1.17 | 1.17 |
| MgO | 6.45 | 6.45 | 6.45 | 6.45 | 6.45 |
| CaO | 0.54 | 0.54 | 0.54 | 0.54 | 0.54 |
| Fe$_2$O$_3$ | 0.68 | 0.8 | 0.8 | 0.54 | 0.54 |

TABLE 2-continued

Examples 48-85.

| | | | | | |
|---|---|---|---|---|---|
| Co3O4 | 0.002 | 0 | 0.002 | 0 | 0.002 |
| NiO | 0 | 0 | 0 | 0 | 0 |
| V2O5 | 0 | 0 | 0 | 0 | 0 |
| TiO2 | 0 | 0 | 0 | 0.2 | 0.2 |
| SnO2 | 0.19 | 0.19 | 0.19 | 0.19 | 0.19 |
| R2O – Al2O3 | 6.58 | 6.58 | 6.58 | 6.58 | 6.58 |
| R2O:Al2O3 | 1.771395 | 1.771395 | 1.771395 | 1.77139508 | 1.771395 |
| R2O | 15.11 | 15.11 | 15.11 | 15.11 | 15.11 |
| Fe2O3 source | Fe2O3/I8 | Fe2O3/I8 | Fe2O3/I8 | Fe2O3/I8 | Fe2O3/I8 |
| reducing agents added | none | none | none | none | none |
| melting furnace environment | globar | globar | globar | globar | globar |
| melting temp (° C.) | 1600 | 1600 | 1600 | 1600 | 1600 |
| total Fe2O3 wt % | 1.51 | 1.81 | 1.82 | | |
| Fe2+ as FeO | 0.37 | 0.44 | 0.41 | | |
| Fe2+/total Fe | 0.27 | 0.27 | 0.25 | | |
| thickness mm | 1.0 | 1.0 | 1.0 | 1.0 | 1.0 |
| D65 L* | 89.6 | 90.1 | 87.8 | | 90.8 |
| D65 a* | −3.65 | −3.45 | −4.16 | | −3.13 |
| D65 b* | 1.4 | 5.41 | 2.82 | | 0.6 |
| Tuv (300-380 nm) | | | | | |
| Tuv (300-400 nm) | 36.1 | | | | 44 |
| Tvis (A2) | 74.2 | | | | 77.4 |
| Tts (%) | 73.3 | | | | 76.59 |
| Thickness (mm) | 0.7 | 0.7 | 0.7 | | 0.7 |
| D65 L* | 91.8 | 91.8 | 90.3 | | 92.6 |
| D65 a* | −2.59 | −2.6 | −3.11 | | −2.232 |
| D65 b* | 1.18 | 4.02 | 1.73 | | 0.439 |
| Tuv (300-380 nm) | | | | | |
| Tuv (300-400 nm) | 44.9 | | | | 52.2 |
| Tvis (A2) | 79.2 | 79.9 | 75.7 | | 81.6 |
| Tts (%) | 78.2 | 76.2 | 75.0 | | 80.76 |
| Thickness (mm) | | | | | |
| D65 L* | | | | | |
| D65 a* | | | | | |
| D65 b* | | | | | |
| Tuv (300-380 nm) | | | | | |
| Tuv (300-400 nm) | | | | | |
| Tvis (A2) | | | | | |
| Tts (%) | | | | | |

| | Ex. | | | | |
|---|---|---|---|---|---|
| | 63 | 64 | 65 | 66 | 67 |
| SiO2 | 69.17 | 69.17 | 69.17 | 69.17 | 69.17 |
| Al2O3 | 8.53 | 8.53 | 8.53 | 8.53 | 8.53 |
| Na2O | 13.94 | 13.94 | 13.94 | 13.94 | 13.94 |
| K2O | 1.17 | 1.17 | 1.17 | 1.17 | 1.17 |
| MgO | 6.45 | 6.45 | 6.45 | 6.45 | 6.45 |
| CaO | 0.54 | 0.54 | 0.54 | 0.54 | 0.54 |
| Fe2O3 | 0.68 | 0.68 | 0.8 | 0.8 | 0.68 |
| Co3O4 | 0 | 0.002 | 0 | 0.002 | 0 |
| NiO | 0 | 0 | 0 | 0 | 0 |
| V2O5 | 0 | 0 | 0 | 0 | 0 |
| TiO2 | 0.2 | 0.2 | 0.2 | 0.2 | 0 |
| SnO2 | 0.19 | 0.19 | 0.19 | 0.19 | 0.19 |
| R2O – Al2O3 | 6.58 | 6.58 | 6.58 | 6.58 | 6.58 |
| R2O:Al2O3 | 1.771395 | 1.771395 | 1.771395 | 1.771395 | 1.771395 |
| R2O | 15.11 | 15.11 | 15.11 | 15.11 | 15.11 |
| Fe2O3 source | Fe2O3/I8 | Fe2O3/I8 | Fe2O3/I8 | Fe2O3/I8 | Fe2O3/I8 |
| reducing agents added | none | none | none | none | none |
| melting furnace environment | globar | globar | globar | globar | gas-oxy |
| melting temp (° C.) | 1600 | 1600 | 1600 | 1600 | 1650 |
| total Fe2O3 wt % | | | | | 1.54 |
| Fe2+ as FeO | | | | | 0.51 |
| Fe2+/total Fe | | | | | 0.37 |
| thickness mm | 1.0 | 1.0 | 1.0 | 1.0 | 1.0 |
| D65 L* | | 89.6 | | | 90.81 |
| D65 a* | | −3.474 | | | −3.64 |
| D65 b* | | 2.442 | | | 2.82 |
| Tuv (300-380 nm) | | | | | |
| Tuv (300-400 nm) | | 35.3 | | | |
| Tvis (A2) | | 74.9 | | | |
| Tts (%) | | 74.06 | | | |
| Thickness (mm) | 0.7 | 0.7 | 0.7 | 0.7 | 0.7 |
| D65 L* | | 91.7 | | | 92.7 |

TABLE 2-continued

| Examples 48-85. | | |
|---|---|---|
| D65 a* | −2.491 | −2.6 |
| D65 b* | 1.766 | 2.55 |
| Tuv (300-380 nm) | | 35.4 |
| Tuv (300-400 nm) | 44.1 | 48.2 |
| Tvis (A2) | 79.7 | 81.5 |
| Tts (%) | 78.69 | 76.0 |
| Thickness (mm) | | |
| D65 L* | | |
| D65 a* | | |
| D65 b* | | |
| Tuv (300-380 nm) | | |
| Tuv (300-400 nm) | | |
| Tvis (A2) | | |
| Tts (%) | | |

| | Ex. | | | | |
|---|---|---|---|---|---|
| | 68 | 69 | 70 | 71 | 72 |
| SiO$_2$ | 69.17 | 69.17 | 69.17 | 69.17 | 69.17 |
| Al$_2$O$_3$ | 8.53 | 8.53 | 8.53 | 8.53 | 8.53 |
| Na$_2$O | 13.94 | 13.94 | 13.94 | 13.94 | 13.94 |
| K$_2$O | 1.17 | 1.17 | 1.17 | 1.17 | 1.17 |
| MgO | 6.45 | 6.45 | 6.45 | 6.45 | 6.45 |
| CaO | 0.54 | 0.54 | 0.54 | 0.54 | 0.54 |
| Fe$_2$O$_3$ | 0.68 | 0.68 | 0.68 | 0.68 | 0.68 |
| Co$_3$O$_4$ | 0 | 0.002 | 0.002 | 0 | 0.002 |
| NiO | 0 | 0 | 0 | 0 | 0 |
| V$_2$O$_5$ | 0 | 0 | 0 | 0 | 0 |
| TiO$_2$ | 0 | 0 | 0 | 0 | 0 |
| SnO$_2$ | 0 | 0 | 0 | 0 | 0 |
| R$_2$O − Al$_2$O$_3$ | 6.58 | 6.58 | 6.58 | 6.58 | 6.58 |
| R$_2$O:Al$_2$O$_3$ | 1.771395 | 1.771395 | 1.771395 | 1.771395 | 1.771395 |
| R$_2$O | 15.11 | 15.11 | 15.11 | 15.11 | 15.11 |
| Fe$_2$O$_3$ source | Fe2O3/I8 | Fe2O3/I8 | oxalate/I2 | Fe2O3/I8 | Fe2O3/I8 |
| reducing agents added | none | none | none | sugar | sugar |
| melting furnace environment | gas-oxy | gas-oxy | gas-oxy | gas-oxy | gas-oxy |
| melting temp (° C.) | 1650 | 1650 | 1650 | 1650 | 1650 |
| total Fe$_2$O$_3$ wt % | 1.64 | 1.72 | 1.84 | 1.52 | 1.52 |
| Fe2+ as FeO | 0.45 | 0.45 | 1.02 | 0.97 | |
| Fe2+/total Fe | 0.3 | 0.29 | 0.62 | 0.71 | |
| thickness mm | 1.0 | 1.0 | 1.0 | 1.0 | 1.0 |
| D65 L* | 91.23 | 88.89 | 85.34 | 86.25 | |
| D65 a* | −3.38 | −4.02 | −6.99 | −9.34 | |
| D65 b* | 3.15 | 0.36 | −1.77 | 10.16 | |
| Tuv (300-380 nm) | | | | | |
| Tuv (300-400 nm) | | | | | |
| Tvis (A2) | | | | | |
| Tts (%) | | | | | |
| Thickness (mm) | 0.7 | 0.7 | 0.7 | 0.7 | |
| D65 L* | 92.0 | 91.4 | 89.5 | 89.5 | |
| D65 a* | −2.95 | −2.86 | −4.68 | −6.6 | |
| D65 b* | 2.59 | 0.52 | −1.06 | 4.82 | |
| Tuv (300-380 nm) | 35.4 | 34.8 | 40.3 | 35.8 | |
| Tuv (300-400 nm) | 48.2 | 47.6 | 51.3 | 44.3 | |
| Tvis (A2) | 82.3 | 78.0 | 71.5 | 74.1 | |
| Tts (%) | 77.3 | 75.8 | 64.5 | 63.0 | |
| Thickness (mm) | | | | | |
| D65 L* | | | | | |
| D65 a* | | | | | |
| D65 b* | | | | | |
| Tuv (300-380 nm) | | | | | |
| Tuv (300-400 nm) | | | | | |
| Tvis (A2) | | | | | |
| Tts (%) | | | | | |

| | Ex. | | | | |
|---|---|---|---|---|---|
| | 73 | 74 | 75 | 76 | 77 |
| SiO$_2$ | 69.17 | 69.17 | 69.17 | 69.17 | 69.17 |
| Al$_2$O$_3$ | 8.53 | 8.53 | 8.53 | 8.53 | 8.53 |
| Na$_2$O | 13.94 | 11.94 | 13.94 | 13.94 | 13.94 |
| K$_2$O | 1.17 | 1.17 | 1.17 | 1.17 | 1.17 |
| MgO | 6.45 | 6.45 | 6.45 | 6.45 | 6.45 |
| CaO | 0.54 | 0.54 | 0.54 | 0.54 | 0.54 |
| Fe$_2$O$_3$ | 0.5 | 0.5 | 0.5 | 0.5 | 0.5 |

TABLE 2-continued

Examples 48-85.

|  |  |  |  |  |  |
|---|---|---|---|---|---|
| $Co_3O_4$ | 0.002 | 0.002 | 0 | 0 | 0 |
| NiO | 0 | 0 | 0.1 | 0.1 | 0 |
| $V_2O_5$ | 0 | 0 | 0 | 0 | 0 |
| $TiO_2$ | 0 | 0 | 0 | 0 | 0 |
| $SnO_2$ | 0 | 0 | 0 | 0 | 0.1 |
| $R_2O - Al_2O_3$ | 6.58 | 4.58 | 6.58 | 6.58 | 6.58 |
| $R_2O:Al_2O_3$ | 1.771395 | 1.536928 | 1.771395 | 1.771395 | 1.771395 |
| $R_2O$ | 15.11 | 13.11 | 15.11 | 15.11 | 15.11 |
| $Fe_2O_3$ source | Fe2O3/I7 | Fe2O3/I8 | Fe2O3/I8 | Fe3O4/I27 | oxalate/I2 |
| reducing agents added | none | sulfate | none | none | none |
| melting furnace environment | gas-oxy | gas-oxy | gas-oxy | gas-oxy | gas-oxy |
| melting temp (° C.) | 1650 | 1650 | 1650 | 1650 | 1650 |
| total $Fe_2O_3$ wt % | 1.21 | 1.21 | 1.09 | 1.24 | 1.22 |
| Fe2+ as FeO | 0.39 |  | 0.41 | 0.42 | 0.82 |
| Fe2+/total Fe | 0.36 |  | 0.42 | 0.38 | 0.75 |
| thickness mm | 1.0 | 1.0 | 1.0 | 1.0 | 1.0 |
| D65 L* | 90.84 | 91.39 | 86.27 | 86.05 |  |
| D65 a* | −3.54 | −3.12 | −0.75 | −1.2 |  |
| D65 b* | −0.6 | −1.25 | 7.04 | 7.2 |  |
| Tuv (300-380 nm) | 33.5 | 40.3 | 38.1 | 33.5 |  |
| Tuv (300-400 nm) | 46.6 | 53.0 | 50.3 | 45.9 |  |
| Tvis (A2) | 76.9 | 78.1 | 69.3 | 68.9 |  |
| Tts (%) | 74.7 | 75.8 | 72.3 | 70.7 |  |
| Thickness (mm) |  |  |  |  | 0.7 |
| D65 L* |  |  |  |  | 92.72 |
| D65 a* |  |  |  |  | −4.27 |
| D65 b* |  |  |  |  | −0.86 |
| Tuv (300-380 nm) |  |  |  |  |  |
| Tuv (300-400 nm) |  |  |  |  |  |
| Tvis (A2) |  |  |  |  | 81.00 |
| Tts (%) |  |  |  |  | 70.5 |
| Thickness (mm) |  |  |  |  | 0.4 |
| D65 L* |  |  |  |  |  |
| D65 a* |  |  |  |  |  |
| D65 b* |  |  |  |  |  |
| Tuv (300-380 nm) |  |  |  |  | 51.5 |
| Tuv (300-400 nm) |  |  |  |  | 62.6 |
| Tvis (A2) |  |  |  |  | 85.3 |
| Tts (%) |  |  |  |  | 77.9 |

|  | Ex. | | | | |
|---|---|---|---|---|---|
|  | 78 | 79 | 80 | 81 | 82 |
| $SiO_2$ | 69.17 | 69.17 | 69.17 | 69.17 | 69.17 |
| $Al_2O_3$ | 8.53 | 8.53 | 8.53 | 8.53 | 8.53 |
| $Na_2O$ | 13.94 | 13.94 | 13.94 | 13.94 | 13.94 |
| $K_2O$ | 1.17 | 1.17 | 1.17 | 1.17 | 1.17 |
| MgO | 6.45 | 6.45 | 6.45 | 6.45 | 6.45 |
| CaO | 0.54 | 0.54 | 0.54 | 0.54 | 0.54 |
| $Fe_2O_3$ | 0.7 | 1 | 0 | 0 | 0 |
| $Co_3O_4$ | 0 | 0 | 0 | 0 | 0 |
| NiO | 0 | 0 | 0 | 0 | 0 |
| $V_2O_5$ | 0 | 0 | 0.01 | 0.02 | 0.05 |
| $TiO_2$ | 0 | 0 | 0 | 0 | 0 |
| $SnO_2$ | 0.1 | 0.1 | 0.1 | 0.1 | 0.1 |
| $R_2O - Al_2O_3$ | 6.58 | 6.58 | 6.58 | 6.58 | 6.58 |
| $R_2O:Al_2O_3$ | 1.771395 | 1.771395 | 1.771395 | 1.771395 | 1.771395 |
| $R_2O$ | 15.11 | 15.11 | 15.11 | 15.11 | 15.11 |
| $Fe_2O_3$ source | oxalate/I2 | oxalate/I2 | none | none | none |
| reducing agents added | none | none | none | none | none |
| melting furnace environment | gas-oxy | gas-oxy | gas-oxy | gas-oxy | gas-oxy |
| melting temp (° C.) | 1650 | 1650 | 1650 | 1650 | 1650 |
| total $Fe_2O_3$ wt % | 1.72 | 2.47 |  |  |  |
| Fe2+ as FeO | 1.13 | 1.69 |  |  |  |
| Fe2+/total Fe | 0.73 | 0.76 |  |  |  |
| thickness mm | 1.0 | 1.0 | 1.0 | 1.0 | 1.0 |
| D65 L* |  |  |  |  |  |
| D65 a* |  |  |  |  |  |
| D65 b* |  |  |  |  |  |
| Tuv (300-380 nm) |  |  |  |  |  |
| Tuv (300-400 nm) |  |  |  |  |  |
| Tvis (A2) |  |  |  |  |  |
| Tts (%) |  |  |  |  |  |

TABLE 2-continued

| Examples 48-85. | | | | | |
|---|---|---|---|---|---|
| Thickness (mm) | 0.7 | 0.7 | 0.7 | 0.7 | 0.7 |
| D65 L* | 90.22 | 85.87 |  | 96.52 | 96.66 |
| D65 a* | −5.42 | −6.6 |  | −0.41 | −0.24 |
| D65 b* | 0.28 | 1.65 |  | 0.41 | 0.23 |
| Tuv (300-380 nm) | | | | | |
| Tuv (300-400 nm) | | | | | |
| Tvis (A2) | 75.20 | 66.70 | 91.30 | 90.80 | 91.10 |
| Tts (%) | 63.7 | 57.3 | 91.2 | 90.3 | 90.9 |
| Thickness (mm) | 0.4 | 0.4 | 0.4 | 0.4 | 0.4 |
| D65 L* | | | | | |
| D65 a* | | | | | |
| D65 b* | | | | | |
| Tuv (300-380 nm) | 41.9 | 26.3 | 80.9 | 60.2 | 74.9 |
| Tuv (300-400 nm) | 52.9 | 37 | 85.1 | 71.9 | 81.5 |
| Tvis (A2) | 81.5 | 75.5 | 91.7 | 91.3 | 91.6 |
| Tts (%) | 72.5 | 67.1 | 91.7 | 91 | 91.5 |

| | Ex. | | |
|---|---|---|---|
| | 83 | 84 | 85 |
| $SiO_2$ | 69.17 | 69.17 | 69.17 |
| $Al_2O_3$ | 8.53 | 8.53 | 8.53 |
| $Na_2O$ | 13.94 | 13.94 | 13.94 |
| $K_2O$ | 1.17 | 1.17 | 1.17 |
| MgO | 6.45 | 6.45 | 6.45 |
| CaO | 0.54 | 0.54 | 0.54 |
| $Fe_2O_3$ | 0 | 0 | 0.7 |
| $Co_3O_4$ | 0 | 0 | 0.001 |
| NiO | 0.05 | 0.1 | 0 |
| $V_2O_5$ | 0 | 0 | 0.02 |
| $TiO_2$ | 0 | 0 | 0 |
| $SnO_2$ | 0.1 | 0.1 | 0.1 |
| $R_2O − Al_2O_3$ | 6.58 | 6.58 | 6.58 |
| $R_2O:Al_2O_3$ | 1.771395 | 1.771395 | 1.771395 |
| $R_2O$ | 15.11 | 15.11 | 15.11 |
| $Fe_2O_3$ source | none | none | oxalate/I2 |
| reducing agents added | none | none | none |
| melting furnace environment | gas-oxy | gas-oxy | gas-oxy |
| melting temp (° C.) | 1650 | 1650 | 1650 |
| total $Fe_2O_3$ wt % | | | 1.72 |
| Fe2+ as FeO | | | 1.13 |
| Fe2+/total Fe | | | 0.73 |
| thickness mm | 1.0 | 1.0 | 1.0 |
| D65 L* | | | |
| D65 a* | | | |
| D65 b* | | | |
| Tuv (300-380 nm) | | | |
| Tuv (300-400 nm) | | | |
| Tvis (A2) | | | |
| Tts (%) | | | |
| Thickness (mm) | 0.7 | 0.7 | 0.7 |
| D65 L* |  | 90.35 | 89.26 |
| D65 a* |  | 1.46 | −5.31 |
| D65 b* |  | 4.06 | 1.2 |
| Tuv (300-380 nm) | | | |
| Tuv (300-400 nm) | | | |
| Tvis (A2) | 85.40 | 77.90 | 73.20 |
| Tts (%) | 88.8 | 85.9 | 63 |
| Thickness (mm) | 0.4 | 0.4 | 0.4 |
| D65 L* | | | |
| D65 a* | | | |
| D65 b* | | | |
| Tuv (300-380 nm) | 89.5 | 89.8 | 37.6 |
| Tuv (300-400 nm) | 90 | 89.9 | 48.7 |
| Tvis (A2) | 88.6 | 84.4 | 79.9 |
| Tts (%) | 90.5 | 88.9 | 71.7 |

Figure 14:
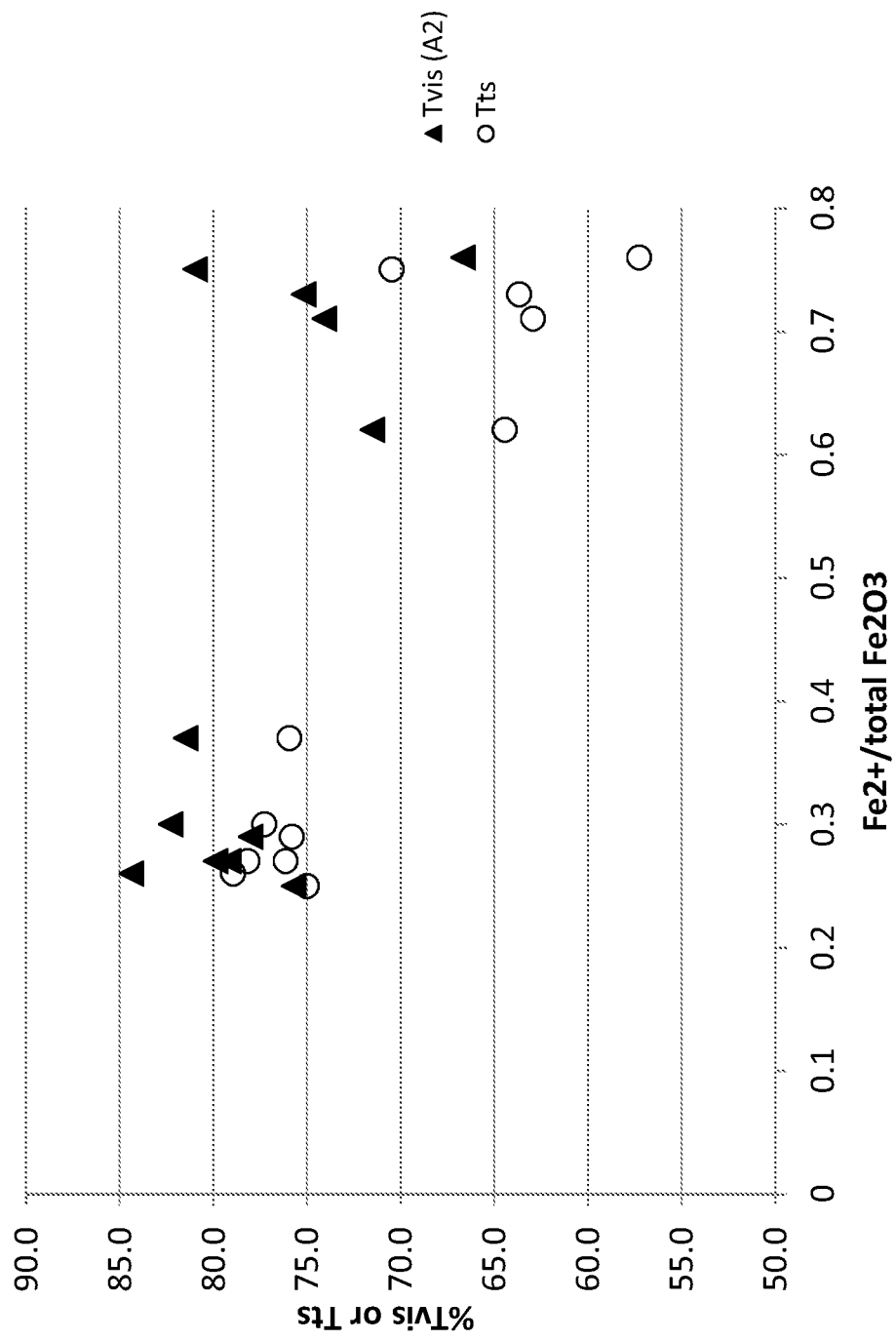
FIG. 14 is a graph showing average transmittance over the visible spectrum (% Tvis) and total solar transmission (% Tts) as a function of the redox state of iron in Examples 57-60, 67-71, and 77-79.

FIG. 14 is a graph showing average transmittance over the visible spectrum (% Tvis) and total solar transmission (% Tts) as a function of the redox state of iron in Examples 57-60, 67-71, and 77-79, at a thickness of 0.7 mm. Examples 57-60, 67-71, and 77-79 have between 1 wt % to 2 wt % Fe. As shown in FIG. 14, glasses with lower $Fe^{2+}$ content were prepared using oxidized iron sources ($Fe_2O_3$ and $Fe_3O_4$) while glasses with a higher level of $Fe^{2+}$ were made using reduced iron such as iron oxalate ($FeC_2O_4$) or addition of sugar as a reducing agent while using $Fe_2O_3$ as iron source. Most reduced glasses (higher $Fe^{2+}$) result in glasses with lower % Tvis and % Tts.

Figure 15:
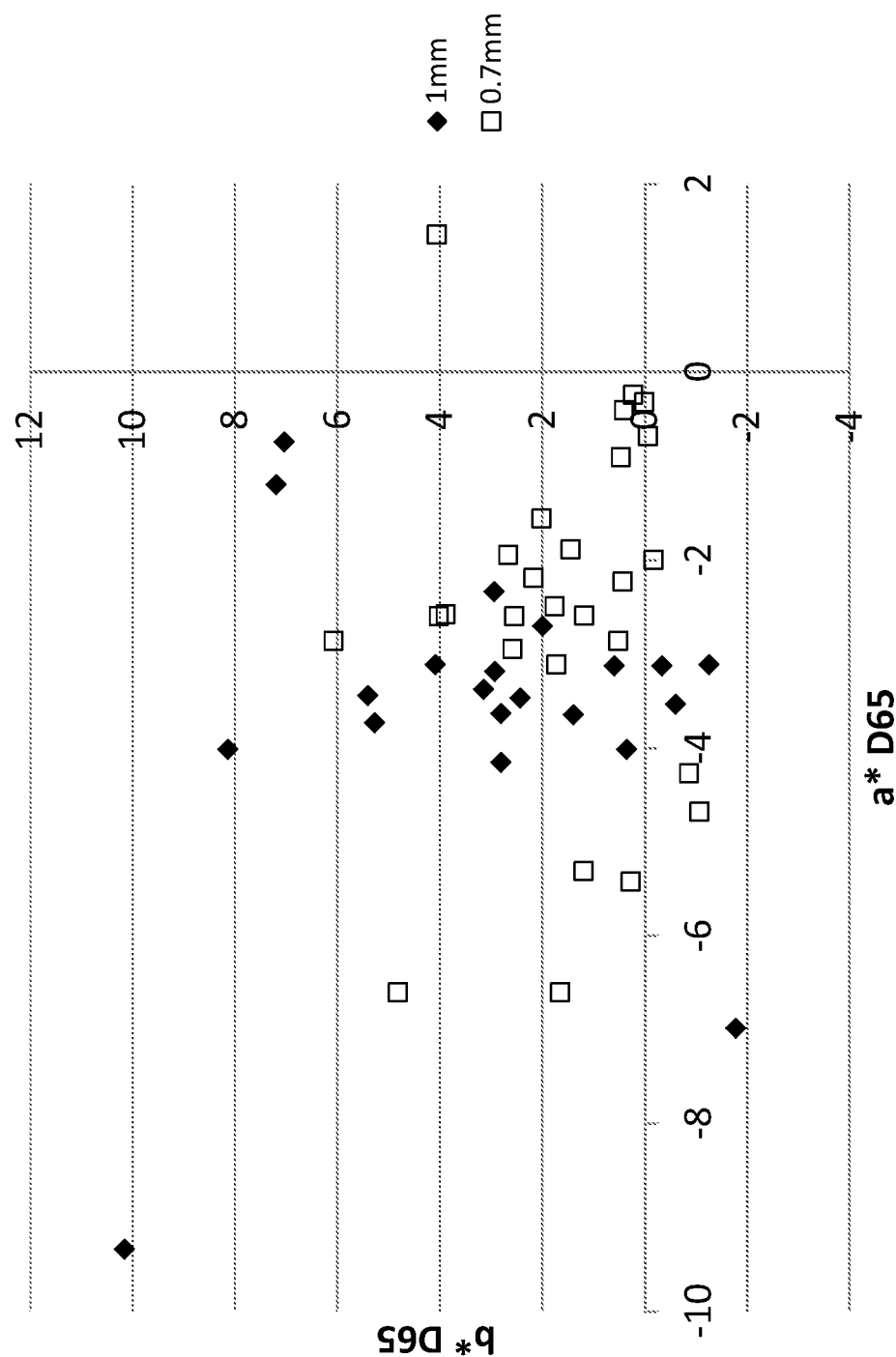
FIG. 15 is a graph showing the a* and b* values (as measured using a D65 illuminant) for Examples 48-85.

FIG. 15 is a graph showing the a* and b* values (as measured using a D65 illuminant) for Examples 48-85, for a 1 mm thickness and a 0.7 mm thickness.

Figure 16:
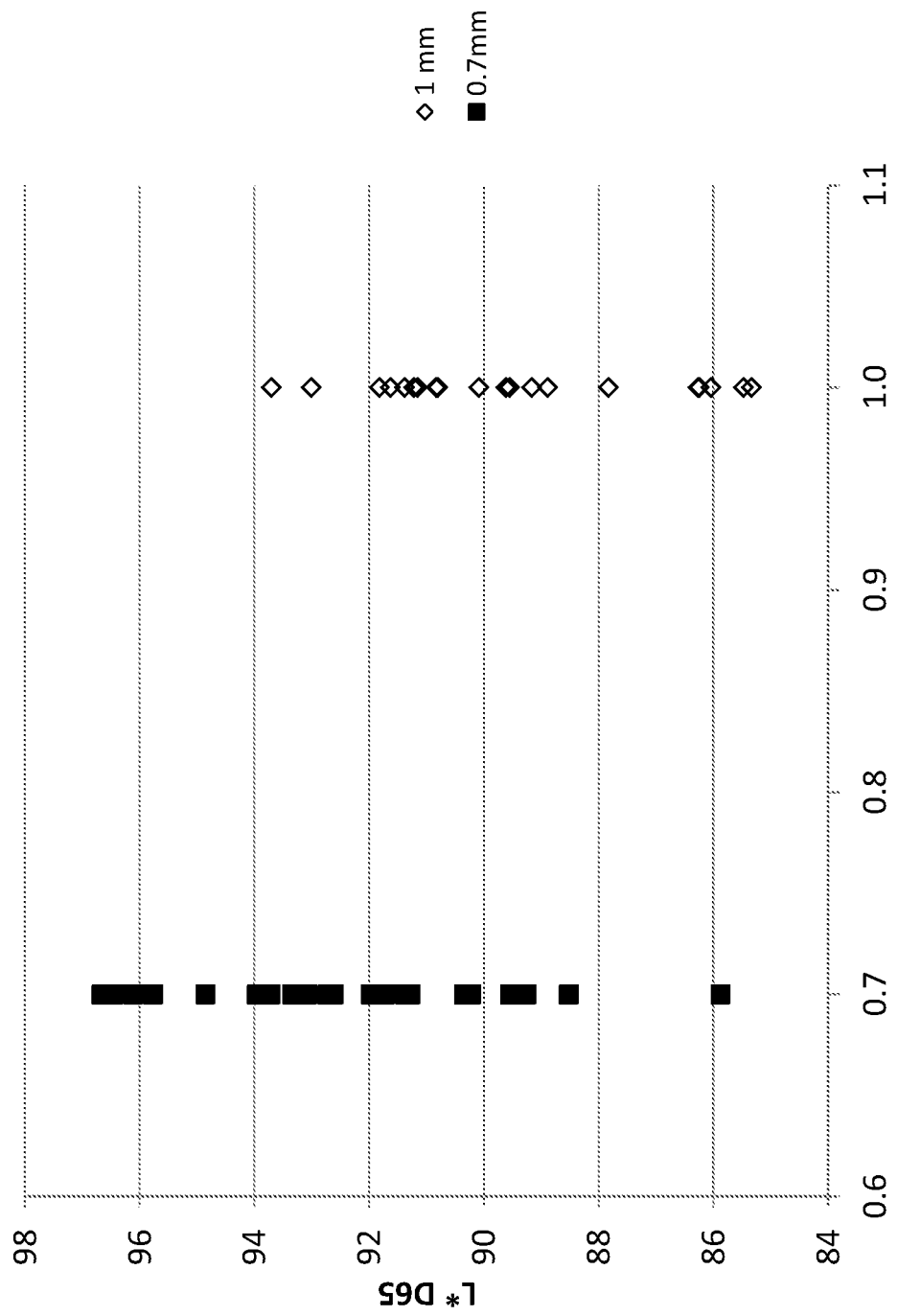
FIG. 16 is a graph showing the L* value (as measured using a D65 illuminant) for Examples 48-85.

FIG. 16 is a graph showing the L* value (as measured using a D65 illuminant) for Examples 48-85, for a 1 mm thickness and 0.7 mm thickness.

Figure 17:
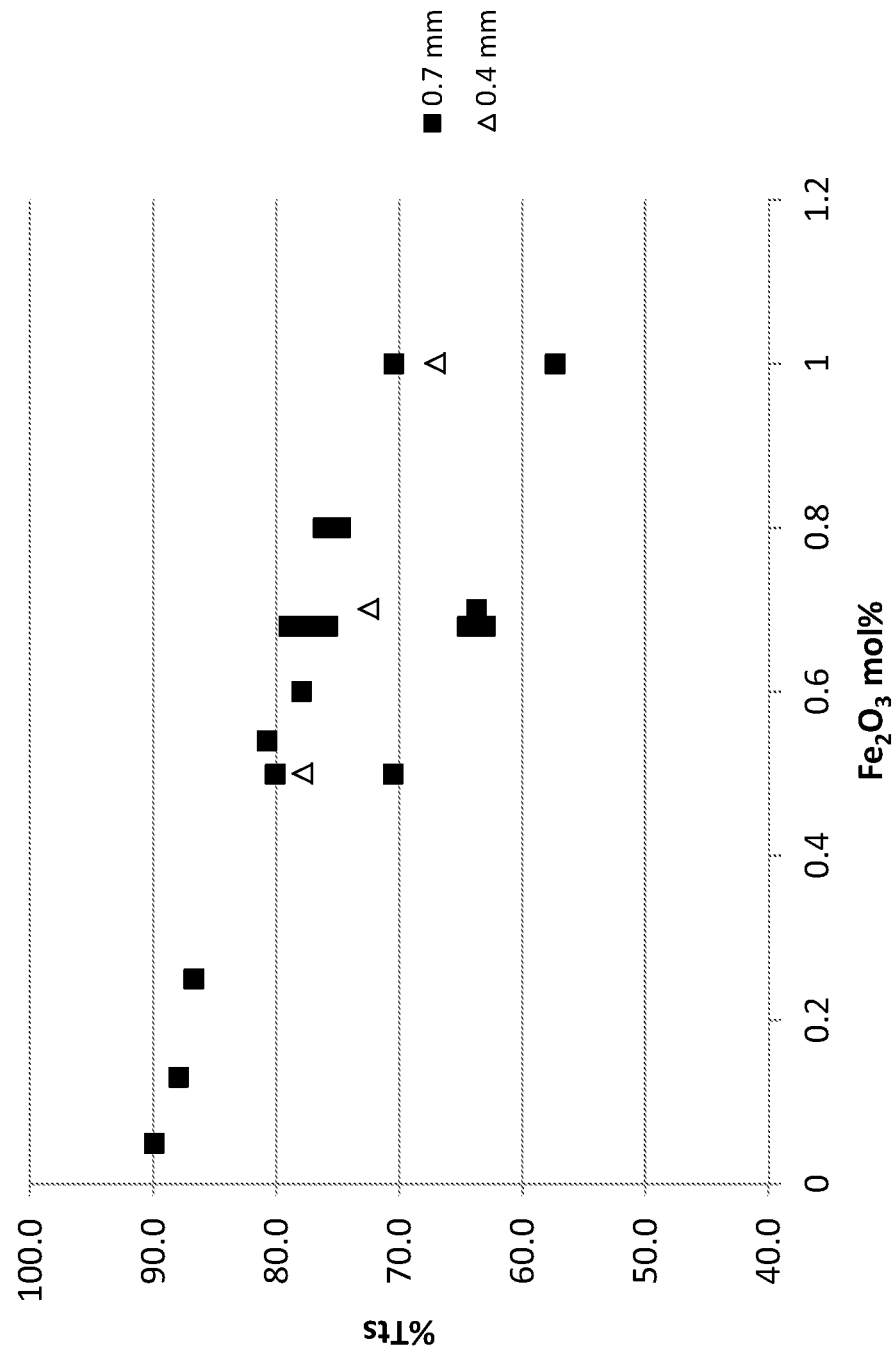
FIG. 17 is a graph of average total solar transmittance (% Tts) as a function of $Fe_2O_3$ amount (mol %) for Examples 48-51, 53-54, 57-60, 62, 64, 67-71, 77-79 and 85.

FIG. 17 is a graph of average total solar transmittance (% Tts) as a function of $Fe_2O_3$ amount (mol %) for Examples 48-51, 53-54, 57-60, 62, 64, 67-71, 77-79 and 85, for thickness of 0.7 mm, and Examples 77-79 for a thickness of 0.4 mm. As shown in FIG. 17, the average total transmittance (% Tts) decreases as iron content increases. For a given iron content, average total transmittance (% Tts) can be reduced by increasing the relative content of $Fe^{2+}$ in the glass.

Without being bound by theory, it is believed the glass composition plays a significant role in the resulting color and transmission spectra exhibited by glass articles formed from the glass composition. For example, glass composition influences the degree of solvation, redox state and coordination number of the transition metals ions. For example, when iron is added to peralkaline glass compositions, the resulting glass articles exhibit green-blue tints. On the other hand, when iron is added to charge balanced glass compositions, the resulting glass articles exhibit grey-brown tints.

In addition, without being bound by theory, the redox state of iron or other transition metals included in glass compositions also affect the absorption over the UV region and visible region of the spectrum, and also affects absorption in the infrared region of the spectra. For example, $Fe^{2+}$ has a strong absorption at a wavelength of approximately 1100 nm.

In the glass compositions of Examples 48-85, $Fe_2O_3$ is used as the main colorant agent; however, other transition metals such as Co, Ni, V, Cu were added in some of the examples to tune the L*a*b* color coordinates of the resulting glass articles glasses and to further modify absorption of the glass article in the visible region and infrared region of the spectra. For example, the addition of cobalt shifts the glass articles to more negative a*, b* values making the glass appear more blue-green. On the other hand, the grey glasses of Examples 1-47 show a shift of a*, b* coordinates to more neutral grey values when Co is included.

Another way to modify the transmission spectra and color of the glasses is by manipulating the redox chemistry of the glass by using different reducing or oxidizing agents.

Reducing agents such as carbon, sugar and Fe oxalate were used as reducing agents in some of the Examples. As shown in FIG. 14, % Tvis increases relative to Tts, as a function of increasing Fe2+ content in the glass.

In summary, Fe content, redox state of iron, addition of additional transition metals can be used to tune and balance color and the transmission spectra of a given glass composition. These levers were used in the Examples and the embodiments described herein to provide glass articles that exhibit the optical requirements for automotive applications, with a fraction of the thickness of typical automotive glass articles, which translates in reduced weight and lower emissions.

Aspect (1) of this disclosure pertains to a glass article comprising a glass composition, the glass composition comprising: $SiO_2$ in an amount in the range from about 40 mol % to about 80 mol %; $Al_2O_3$ in an amount greater than about 4 mol %; CaO in an amount less than about 6 mol %; $B_2O_3$ or MgO, wherein MgO is present in an amount in the range from about 0 to about 13 mol %; a non-zero amount of alkali metal oxides ($R_2O$), wherein the glass article exhibits a difference between $R_2O$ and the amount of $Al_2O_3$ in the range from about −0.5 to about 1.5; and Fe expressed as $Fe_2O_3$, wherein Fe is present in an amount up to about 1 mol %.

Aspect (2) of this disclosure pertains to the glass article of Aspect (1), wherein, when the glass article has a thickness of 0.7 mm, it exhibits an average total solar transmittance of about 88% or less, over a wavelength range from about 300 nm to about 2500 nm.

Aspect (3) of this disclosure pertains to the glass article of Aspect (1) or Aspect (2), wherein the glass composition further comprises $SnO_2$ in an amount equal to or less than about 0.2 mol %.

Aspect (4) of this disclosure pertains to the glass article of any one of Aspects (1) through (3), wherein the glass composition further comprises a compositional ratio of $R_2O$ to $Al_2O_3$ that is less than or equal to about 1.5.

Aspect (5) of this disclosure pertains to the glass article of any one of Aspects (1) through (4), wherein the glass article exhibits an average transmittance in the range from about 75% to about 85%, at a thickness of 0.7 mm, over a wavelength range from about 380 nm to about 780 nm.

Aspect (6) of this disclosure pertains to the glass article of any one of Aspects (1) through (5), wherein the compositional ratio of $R_2O$ to $Al_2O_3$ is in the range from about 0.8 to about 1.5.

Aspect (7) of this disclosure pertains to the glass article of any one of Aspects (1) through (6), wherein the glass composition further comprises $Li_2O$.

Aspect (8) of this disclosure pertains to the glass article of any one of Aspects (1) through (7), further exhibiting color coordinates in transmittance, under CIE L*a*b* (CIELAB) color space, under a D65 illuminant, wherein a* is in the range from about −2 to about 5, b* is in the range from about −1 to about 10, and L* is in the range from about 55 to about 98.

Aspect (9) of this disclosure pertains to the glass article of any one of Aspects (1) through (8), wherein the total amount of Fe, expressed as $Fe_2O_3$, is present in an amount in the range from about 0.1 mol % to about 1 mol %.

Aspect (10) of this disclosure pertains to the glass article of any one of Aspects (1) through (9), wherein the glass composition further comprises a total amount of Co, expressed as $Co_3O_4$, in an amount in the range from about 0.001 mol % to 0.007 mol %.

Aspect (11) of this disclosure pertains to the glass article of any one of Aspects (1) through (10), wherein the glass composition further comprises any one or more of NiO, $V_2O_5$, and $TiO_2$.

Aspect (12) of this disclosure pertains to the glass article of any one of Aspects (1) through (11), wherein the glass composition comprises: $SiO_2$ in an amount in the range from about 60 mol % to 75 mol %; $Al_2O_3$ in an amount in the range from about 8 mol % to about 14 mol %; $B_2O_3$ in an amount in the range from about 6 mol % to about 10 mol %; $R_2O$ in an amount in the range from about 6 mol % to about 14 mol %; and MgO in an amount in the range from about 0 mol % to about 2 mol %.

Aspect (13) of this disclosure pertains to the glass article of any one of Aspects (1) through (12), wherein the glass article is strengthened.

Aspect (14) of this disclosure pertains to a glass article comprising a glass composition, the composition comprising: $SiO_2$ in an amount in the range from about 40 mol % to about 80 mol %; $Al_2O_3$ in an amount greater than about 5% mol %; a total amount of alkali metal oxides ($R_2O$), wherein a ratio of $R_2O$ to $Al_2O_3$ equal to or greater than about 1; $Na_2O$; MgO in an amount in the range from about 0 to about 13 mol %, at least one of $K_2O$, $SnO_2$ and $TiO_2$, wherein $K_2O$ is present in an amount greater than 1 mol % and, wherein $TiO_2$ is present in an amount less than about 2.5 mol %, and a ratio of $Na_2O$ to $K_2O$ greater than about 10.

Aspect (15) of this disclosure pertains to the glass article of Aspect (14) wherein, when the glass article has a thickness of 0.7 mm, the glass article exhibits has an average total solar transmittance of about 88% or less, over a wavelength range from about 300 nm to about 2500 nm.

Aspect (16) of this disclosure pertains to the glass article of Aspect (14) or (15), wherein the glass composition further comprises $SnO_2$ in an amount equal to or less than about 0.2 mol %.

Aspect (17) of this disclosure pertains to the glass article of any one of Aspects (14) through Aspect (16), wherein the glass composition is substantially free of $Li_2O$.

Aspect (18) of this disclosure pertains to the glass article of any one of Aspects (14) through (17), wherein the glass composition further comprises Fe expressed as $Fe_2O_3$, wherein the total amount of Fe expressed as $Fe_2O_3$ is in a range from about 0 mol % to about 1 mol %.

Aspect (19) of this disclosure pertains to the glass article of any one of Aspects (14) through (18), wherein, when the glass has a thickness of 0.7 mm, the glass article exhibits an average transmittance in the range from about 75% to about 85%, over a wavelength range from about 380 nm to about 780 nm.

Aspect (20) of this disclosure pertains to the glass article of any one of Aspects (14) through (19), wherein the ratio of $R_2O$ to $Al_2O_3$ is in the range from about 1 to about 12.

Aspect (21) of this disclosure pertains to the glass article of any one of Aspects (14) through (20), further exhibiting color coordinates in transmittance, under CIE L*a*b* (CIELAB) color space, under a D65 illuminant, wherein a* is in the range from about −10 to about 0, b* is in the range from about −3 to about 10 and L* is in the range from about 80 to about 95.

Aspect (22) of this disclosure pertains to the glass article of any one of Aspects (14) through (21), wherein the glass composition further comprises any one or more of NiO, $V_2O_5$, Co expressed as $Co_3O_4$, and $TiO_2$.

Aspect (23) of this disclosure pertains to the glass article of any one of Aspects (14) through (22), wherein the glass composition comprises: $SiO_2$ in an amount in the range from about 60 mol % to 75 mol %; $Al_2O_3$ in an amount in the range from about 6 mol % to about 12 mol %; $R_2O$ in an amount in the range from about 10 mol % to about 16 mol %; and MgO in an amount in the range from about 1 mol % to about 10 mol %.

Aspect (24) of this disclosure pertains to the glass article of any one of Aspects (14) through (23), wherein the glass composition is substantially free of $B_2O_3$.

Aspect (25) of this disclosure pertains to the glass article of any one of Aspects (14) through (24), wherein the glass article is strengthened.

Aspect (26) of this disclosure pertains to a laminate comprising: a first glass layer; an interlayer disposed on the first glass layer; and a second glass layer disposed on the interlayer opposite the first glass layer, wherein either one of or both the first glass layer and the second glass layer comprises the glass article according to any one of Aspects (1) through (13).

Aspect (27) of this disclosure pertains to the laminate of Aspect (26), wherein either one of or both the first glass layer and the second glass layer comprise a thickness less than 1.6 mm.

Aspect (28) of this disclosure pertains to the laminate of Aspect (26) or Aspect (27), wherein either one of or both the first glass layer and the second glass layer is strengthened.

Aspect (29) of this disclosure pertains to a laminate comprising: a first glass layer; an interlayer disposed on the first glass layer; and a second glass layer disposed on the interlayer opposite the first glass layer, wherein either one of or both the first glass layer and the second glass layer comprise the glass article according to any one of Aspects (14) through (25).

Aspect (30) of this disclosure pertains to the laminate of Aspect (29), wherein either one of or both the first glass layer and the second glass layer comprise a thickness less than 1.6 mm.

Aspect (31) of this disclosure pertains to the laminate of Aspect (29) or (30), wherein either one of or both the first glass layer and the second glass layer is strengthened.

Aspect (32) of this disclosure pertains to a method for forming a glass article comprising: melting a batch composition at a temperature greater than about 1300° C. to form a molten glass, wherein the batch composition comprises an iron source and the glass composition of any one of Aspects (1) through (25); and forming the molten glass into a sheet.

Aspect (33) of this disclosure pertains to the method of Aspect (32), where the batch composition is melted in an environment comprising an oxygen fugacity of less than about 0.2.

Aspect (34) of this disclosure pertains to the method of Aspect (32) or (33), wherein the iron source comprises any one or more of $Fe_2O_3$, $Fe_3O_4$, and iron oxalate.

Aspect (35) of this disclosure pertains to the method of any one of Aspects (32) through (34), wherein melting the batch comprises adding a reducing agent to the batch.

Aspect (36) of this disclosure pertains to the method of any one of Aspects (32) through (35), wherein the reducing agent is selected from carbon, and carbon-containing compounds.

Aspect (37) of this disclosure pertains to a vehicle comprising: a body comprising an interior; an opening in the body in communication with interior; a window disposed in the opening, the window comprising the glass article according to any one of Aspects (1) through (25).

Aspect (38) of this disclosure pertains to a vehicle comprising: a body comprising an interior; an opening in the body in communication with interior; a window disposed in the opening, the window comprising the laminate according to any one of Aspects (26) through (31).

It will be apparent to those skilled in the art that various modifications and variations can be made without departing from the spirit or scope of the invention.

What is claimed is:

1. A glass article comprising a glass composition, the glass composition comprising:
   $SiO_2$ in an amount in a range from 40 mol % to 80 mol %;
   $Al_2O_3$ in an amount greater than 4 mol %;
   CaO in an amount less than 6 mol %;
   $B_2O_3$ in an amount in a range from 6 mol % to 14 mol %;
   MgO in an amount in a range from 0 mol % to 13 mol %;
   alkali metal oxides ($R_2O$) in an amount greater than 2.5 mol %, wherein the glass article exhibits a difference between $R_2O$ and the amount of $Al_2O_3$ ([$R_2O$]-[$Al_2O_3$]) in a range from −0.5 to 1.5; and Fe expressed as $Fe_2O_3$, wherein Fe is in an amount up to 1 mol %,
wherein the glass composition is substantially free of $TiO_2$.

2. The glass article of claim 1, wherein the glass composition further comprises $SnO_2$ in an amount equal to or less than about 0.2 mol %.

3. The glass article of claim 1, wherein the glass composition further comprises $Li_2O$.

4. The glass article of claim 1, wherein a total amount of Fe, expressed as $Fe_2O_3$, is in an amount in a range from 0.1 mol % to 1 mol %.

5. The glass article of claim 4, wherein Fe is in an amount from 0.3 mol % to 1 mol %.

6. The glass article of claim 5, wherein Fe is in an amount from 0.5 mol % to 1 mol %.

7. The glass article of claim 1, wherein the glass composition further comprises a total amount of Co, expressed as $Co_3O_4$, in an amount in a range from 0.001 mol % to 0.007 mol %.

8. The glass article of claim 1, wherein the glass composition further comprises any one or more of NiO or $V_2O_5$.

9. The glass article of claim 1, wherein the glass composition is substantially free of $V_2O_5$.

10. The glass article of claim 1, wherein the glass composition is substantially free of NiO.

11. The glass article of claim 1, wherein the glass composition comprises:
$SiO_2$ in an amount in a range from 60 mol % to 75 mol %;
$Al_2O_3$ in an amount in a range from 8 mol % to 14 mol %;
$B_2O_3$ in an amount in a range from 6 mol % to 10 mol %;
$R_2O$ in an amount in a range from 7.5 mol % to 14 mol %; and
MgO in an amount in a range from 0 mol % to 2 mol %.

12. The glass article of claim 11, wherein the amount of $SiO_2$ is in a range from 65 mol % to 75 mol %.

13. The glass article of claim 1, wherein the glass composition is substantially free of $ZrO_2$.

14. The glass article of claim 1, wherein the amount of MgO is in a range from 1 mol % to 2 mol %.

15. The glass article of claim 1, wherein $R_2O$ comprises $Na_2O$ in an amount from 4 mol % to 14 mol %.

16. The glass article of claim 15, wherein the amount of $Na_2O$ is from 4 mol % to 10 mol %.

17. The glass article of claim 15, wherein $R_2O$ further comprises $K_2O$, and a compositional ratio of $Na_2O$ to $K_2O$ ($Na_2O:K_2O$) is greater than 10.

18. The glass article of claim 1, wherein the amount of $B_2O_3$ is from 8 mol % to 14 mol %.

19. The glass article of claim 1, wherein the glass composition further comprises a compositional ratio of $R_2O$ to $Al_2O_3$ ($R_2O:Al_2O_3$) that is less than or equal to 1.375.

20. The glass article of claim 1, wherein the compositional ratio of $R_2O$ to $Al_2O_3$ ($R_2O:Al_2O_3$) is in a range from 0.8 to 1.375.

21. The glass article of claim 1, wherein the glass article is substantially free of crystals or crystallites.

22. The glass article of claim 1, wherein, when the glass article has a thickness of 0.7 mm, it exhibits an average total solar transmittance of 88% or less over a wavelength range from 300 nm to 2500 nm.

23. The glass article of claim 22, wherein the average total solar transmittance is in a range from 60% to 88%.

24. The glass article of claim 1, wherein the glass article exhibits an average transmittance in a range from 75% to 85%, at a thickness of 0.7 mm over a wavelength range from 380 nm to 780 nm.

25. The glass article of claim 1, further exhibiting color coordinates in transmittance, under CIE L*a*b* (CIELAB) color space, under a D65 illuminant, wherein a* is in a range from −2 to 5, b* is in a range from −1 to 10, and L* is in a range from 55 to 98.

26. The glass article of claim 25, wherein a* is in a range from −1.5 to 5.

27. The glass article of claim 25, wherein L* is in a range from 65 to 98.

28. The glass article of claim 1, wherein the glass article is strengthened.

29. A laminate comprising:
a first glass layer;
an interlayer disposed on the first glass layer; and
a second glass layer disposed on the interlayer opposite the first glass layer, wherein either one of or both the first glass layer and the second glass layer comprises the glass article according to claim 1.

30. The laminate of claim 29, wherein either one of or both the first glass layer and the second glass layer comprise a thickness less than 1.6 mm.

31. The laminate of claim 29, wherein either one of or both the first glass layer and the second glass layer is strengthened.

32. A vehicle comprising:
a body comprising an interior;
an opening in the body in communication with interior;
a window disposed in the opening, the window comprising the laminate according to claim 29.

33. A method for forming a glass article comprising:
melting a batch composition at a temperature greater than 1300° C. to form a molten glass, wherein the batch composition comprises an iron source and the glass composition of claim 1; and
forming the molten glass into a sheet.

34. The method of claim 33, where the batch composition is melted in an environment comprising an oxygen fugacity of less than 0.2.

35. The method of claim 33, wherein the iron source comprises any one or more of $Fe_2O_3$, $Fe_3O_4$, or iron oxalate.

36. The method of claim 33, wherein melting the batch comprises adding a reducing agent to the batch.

37. The method of claim 33, wherein the reducing agent is selected from carbon and carbon-containing compounds.

38. A vehicle comprising:
a body comprising an interior;
an opening in the body in communication with interior;
a window disposed in the opening, the window comprising the glass article according to claim 1.

* * * * *

UNITED STATES PATENT AND TRADEMARK OFFICE
CERTIFICATE OF CORRECTION

PATENT NO. : 10,858,280 B2
APPLICATION NO. : 15/817899
DATED : December 8, 2020
INVENTOR(S) : Matthew John Dejneka et al.

Page 1 of 1

It is certified that error appears in the above-identified patent and that said Letters Patent is hereby corrected as shown below:

In the Claims

In Column 51, Line 7, Claim 2, after "than" delete "about".

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*